United States Patent
Oki et al.

(10) Patent No.: US 9,931,923 B2
(45) Date of Patent: Apr. 3, 2018

(54) BRACKET-EQUIPPED VIBRATION-DAMPING DEVICE

(71) Applicant: SUMITOMO RIKO COMPANY LIMITED, Komaki-shi, Aichi (JP)

(72) Inventors: Kenji Oki, Komaki (JP); Kei Okumura, Komaki (JP); Tomohiro Kanaya, Komaki (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 0 days.

(21) Appl. No.: 15/425,176

(22) Filed: Feb. 6, 2017

(65) Prior Publication Data
US 2017/0341500 A1 Nov. 30, 2017

(30) Foreign Application Priority Data

May 31, 2016 (JP) .................................. 2016-108312
Jun. 10, 2016 (JP) .................................. 2016-116485

(51) Int. Cl.
*F16F 13/08* (2006.01)
*B60K 5/12* (2006.01)
*F16F 1/36* (2006.01)
*F16F 3/087* (2006.01)
*F16F 15/08* (2006.01)

(52) U.S. Cl.
CPC .......... *B60K 5/1208* (2013.01); *F16F 1/3605* (2013.01); *F16F 3/0873* (2013.01); *F16F 15/08* (2013.01); *F16F 13/085* (2013.01)

(58) Field of Classification Search
CPC .... F16F 1/36; F16F 13/08; F16F 13/10; F16F 13/103; F16F 15/08; B60K 5/1208

USPC ................. 267/140.13–140.15, 140.2–140.5; 248/562, 634, 635
See application file for complete search history.

(56) References Cited

U.S. PATENT DOCUMENTS 9,651,111 B2 * 5/2017 Muraoka ................. F16F 13/08
2005/0098374 A1 5/2005 Moon
(Continued)

FOREIGN PATENT DOCUMENTS

FR 2 810 712 A1 12/2001

OTHER PUBLICATIONS

U.S. Appl. No. 15/209,031, filed Jul. 13, 2016.

*Primary Examiner* — Christopher P Schwartz
(74) *Attorney, Agent, or Firm* — Oliff PLC

(57) ABSTRACT

A bracket-equipped vibration-damping device including: a vibration-damping device main body including vertically-separated, elastically-connected first and second mounting members; a bracket receiving the device main body inserted laterally thereinto; a connection-insert section provided for the second mounting member; a connection groove provided for the bracket extending in an insertion direction of the device main body; at least one up-down urging rubber fixed on an outer surface of the connection-insert section on an upper-lower first side; and a lock protrusion formed on an inner surface of the connection groove on an upper-lower second side, with a smaller protrusion dimension than an up-down thickness of the up-down urging rubber such that the connection-insert section is laterally inserted into the connection groove beyond the lock protrusion before being urged to the second side by the up-down urging rubber to be positioned to the connection groove.

12 Claims, 16 Drawing Sheets

(56) References Cited

U.S. PATENT DOCUMENTS

| | | |
|---|---|---|
| 2010/0264570 A1 | 10/2010 | Thierry et al. |
| 2015/0041617 A1* | 2/2015 | Okumura ............... F16F 13/08 248/562 |
| 2015/0252866 A1 | 9/2015 | Muraoka et al. |
| 2016/0238102 A1* | 8/2016 | Goto .................... B60K 5/1208 |
| 2017/0122398 A1* | 5/2017 | Michiyama .......... B60K 5/1208 |
| 2017/0335920 A1* | 11/2017 | Kanaya ................ B60K 5/1208 |

\* cited by examiner

BRACKET-EQUIPPED VIBRATION-DAMPING DEVICE

INCORPORATED BY REFERENCE

The disclosures of Japanese Patent Application Nos. 2016-108312 filed on May 31, 2016 and 2016-116485 filed on Jun. 10, 2016, each including the specification, drawings and abstract is incorporated herein by reference in its entirety.

BACKGROUND OF THE INVENTION

1. Field of the Invention

The present invention relates to a bracket-equipped vibration-damping device used for an automotive engine mount etc.

2. Description of the Related Art

From the past, a vibration-damping device has been known as a kind of vibration-damping support body or vibration-damping connecting body that is interposed between members constituting a vibration-damping system to provide mutual vibration-damping linkage between the constituent members of the vibration-damping system. For example, the vibration-damping device is applied to an automotive engine mount or the like. This vibration-damping device has a vibration-damping element wherein a second strength member and a first strength member, which are separated in the up-down direction, are elastically linked to one another by an elastomer body, as some documents, e.g., U.S. Publication No. US 2010/0264570, disclose.

Also, US 2010/0264570 shows a bracket-equipped vibration-damping device wherein a support body is attached to the vibration-damping element. The support body includes a slider extending in the lateral direction. By a rib provided in the first strength member being inserted and guided on the slider, the first strength member is inserted and fixed into the support body in the lateral direction, so that the vibration-damping element is equipped with the support body.

In the vibration-damping device of US 2010/0264570, snap-fitting, or inserting a snap-fitting lug provided for the rib of the vibration-damping element into a notch provided for the slider of the support body and engaging them elastically, avoids dislodgement of the vibration-damping element out of the support body.

However, for the retainment structure using the snap-fitting shown in US 2010/0264570, upon assembly of the vibration-damping element and the support body, at least one of the rib including the snap-fitting lug and the slider including the notch must undergo elastic deformation, so that the structure suffers from damages made during the deformation and the like. Especially if the at least one of the rib and the slider is formed of a synthetic resin for weight reduction and formability improvement, the vibration-damping device readily suffers from damages of the vibration-damping element and the support body caused by the elastic deformation in mounting the support body. This may lead to secular deterioration, which might give rise to separation of the vibration-damping element and the support body as well. On the other hand, if you try to form the snap-fitting lug and the notch that are elastically deformable with respect to the rib and the slider that are formed of a metal, it becomes difficult to manufacture the rib and the slider by molding. In addition, later-processing becomes necessary for forming the snap-fitting lug and the notch.

Besides, by inserting the rigid rib into the rigid slider from a lateral side, the vibration-damping element and the support body are positioned to one another. Therefore, the support body, which includes the slider, being formed of such material like a synthetic resin that the dimension may change by secular deterioration could suffer from noise caused by rattling due to a gap between the vibration-damping element and the support body.

SUMMARY OF THE INVENTION

It is therefore one object of the present invention to provide a bracket-equipped vibration-damping device of a novel structure, which is able to stably retain a bracket in an appropriate mounted state to a vibration-damping device main body with a simple structure that is easy to manufacture.

The above and/or optional objects of this invention may be attained according to at least one of the following modes of the invention. The following modes and/or elements employed in each mode of the invention may be adopted at any possible optional combinations.

Specifically, a first mode of the present invention provides a bracket-equipped vibration-damping device comprising: a vibration-damping device main body including: a first mounting member; a second mounting member being separated from the first mounting member in an up-down direction; and a main rubber elastic body elastically connecting the first and second mounting members to one another; a bracket receiving the vibration-damping device main body inserted thereinto in a lateral direction; a connection-insert section provided for the second mounting member of the vibration-damping device main body; a connection groove provided for the bracket, the connection groove extending in an insertion direction of the vibration-damping device main body into the bracket; at least one up-down urging rubber fixed on an outer surface of the connection-insert section on a first side of upper and lower sides; and a lock protrusion formed on an inner surface of the connection groove on a second side of the upper and lower sides, with a smaller protrusion dimension than an up-down thickness of the up-down urging rubber such that the connection-insert section is inserted into the connection groove in the lateral direction beyond the lock protrusion before the connection-insert section is urged to the second side by the up-down urging rubber so as to be positioned relative to the connection groove.

With this bracket-equipped vibration-damping device structured according to the first mode, in the structure wherein the vibration-damping device main body is inserted into the bracket in the lateral direction, the connection-insert section of the vibration-damping device main body is inserted into the connection groove of the bracket beyond the lock protrusion. Upon this insertion, the up-down urging rubber undergoes elastic deformation, thereby eliminating the need of deformation of the connection-insert section and the connection groove. This avoids damages on the connection-insert section and the connection groove upon the insertion of the connection-insert section into the connection groove, thereby improving the durability.

Moreover, the connection-insert section, which is inserted into the connection groove beyond the lock protrusion, is urged to the second side of the upper and lower sides by elasticity of the up-down urging rubber compressed between the connection-insert section and the connection groove in the up-down direction. Consequently, the lock protrusion limits displacement of the connection-insert section toward the extraction side from the connection groove. This avoids separation of the vibration-damping device main body and the bracket due to extraction of the connection-insert section from the connection groove, thereby improving the reliability.

A second mode of the present invention provides the bracket-equipped vibration-damping device according to the first mode, wherein the lock protrusion is formed partially in a groove depth direction of the connection groove, while a notch opens on a surface of the connection-insert section on the second side in a position corresponding to the lock protrusion, and for the surface of the connection-insert section on the second side, a portion apart from the notch is a support surface that abuts the inner surface of the connection groove, and a detent projection is formed on a back side of the notch in the insertion direction so as to project further outward in the up-down direction than an up-down base face of the notch, and the detent projection is slid into the connection groove beyond the lock protrusion and locked in the lock protrusion in an extraction direction.

According to the second mode, the lock protrusion formed in the connection groove moves relatively in the notch of the connection-insert section in the insertion direction. As a result, it is possible to avoid sliding contact between the connection-insert section and the lock protrusion from obstructing the insertion of the connection-insert section into the connection groove. Moreover, the detent projection, which is located on the back side of the notch in the insertion direction, is inserted into the connection groove beyond the lock protrusion. By so doing, the detent projection and the lock protrusion are locked in the extraction direction, thereby limiting relative displacement of the connection-insert section toward the extraction side out of the connection groove in order to prevent the separation of the vibration-damping device main body and the bracket.

Upon the insertion of the connection-insert section into the connection groove, the support surface of the connection-insert section slides in contact with the groove inner surface of the connection groove on the second side of the upper and lower sides in a position apart from the lock protrusion in the groove depth direction of the connection groove. Therefore, the connection-insert section is guided to the insertion side by the groove inner surface of the connection groove, making it easier to insert the connection-insert section into the connection groove.

A third mode of the present invention provides the bracket-equipped vibration-damping device according to the second mode, wherein the up-down urging rubber is positioned on a front side of the detent projection in the insertion direction.

With the third mode, the up-down urging rubber is not provided in a portion of the connection-insert section that is overlapped with the detent projection as viewed in the up-down direction. Therefore, when the detent projection is sliding beyond the lock protrusion, the connection-insert section is allowed to tilt relative to the insertion direction (undergo prizing displacement), so that the detent projection slides beyond the lock protrusion more easily.

A fourth mode of the present invention provides the bracket-equipped vibration-damping device according to the first mode, wherein a protruding tip face of the lock protrusion is an incline relative to the insertion direction so that the protrusion dimension of the lock protrusion is gradually smaller as it goes backward in the insertion direction.

According to the fourth mode, since the up-down dimension of the back face of the lock protrusion is small, the connection-insert section more readily slides beyond the lock protrusion to the insertion side. Also, since the up-down dimension of the front face of the lock protrusion is large, retainment is effectively realized by locking of the lock protrusion in the connection-insert section after sliding beyond the lock protrusion. Consequently, it is possible to prevent the connection-insert section from sliding beyond the lock protrusion toward the extraction side.

A fifth mode of the present invention provides the bracket-equipped vibration-damping device according to the first mode, wherein the up-down urging rubber is fixed on an upper surface of the connection-insert section, while the lock protrusion protrudes in a lower inner surface of the connection groove.

With the fifth mode, it is possible to avoid excessive compression of the up-down urging rubber by distributed load input downward applied on the vibration-damping device main body from the constituent member of the vibration transmission system or the like. As a result, it is easier to prevent rattling of the vibration-damping device main body and the bracket due to sinkage of the up-down urging rubber.

A sixth mode of the present invention provides the bracket-equipped vibration-damping device according to the first mode, wherein a surface of the connection-insert section on the second side directly abuts the inner surface of the connection groove of the bracket.

According to the sixth mode, the connection-insert section is abutted on the inner surface of the connection groove directly, not via a rubber etc. Consequently, the connection-insert section and the connection groove are relatively positioned, whereby the vibration-damping device main body and the bracket are favorably positioned and retained.

A seventh mode of the present invention provides the bracket-equipped vibration-damping device according to the first mode, further comprising: a front-back urging rubber fixed on a front surface of the connection-insert section in the insertion direction; and a front wall provided for the bracket that obstructs a front end of the connection groove in the insertion direction so that the front-back urging rubber is compressed in a front-back direction of the insertion direction between the connection-insert section and the front wall.

According to the seventh mode, the connection-insert section is urged to the extraction side (the back side of the insertion direction) by elasticity of the urging rubber compressed in the front-back direction of the insertion direction. This abuts the connection-insert section on the lock protrusion of the connection groove in the extraction direction. By so doing, the connection-insert section is positioned within the connection groove on both front and back sides in the insertion direction. Additionally, this avoids noise resulting from contact of separated connection-insert section and lock protrusion.

An eighth mode of the present invention provides the bracket-equipped vibration-damping device according to the first mode, wherein the at least one up-down urging rubber comprises a first up-down urging rubber and a second up-down urging rubber, and the first up-down urging rubber is fixed on the outer surface of the connection-insert section on the first side, while the second up-down urging rubber is fixed on an outer surface of the connection-insert section on the second side, and the protrusion dimension of the lock protrusion is smaller than a sum of up-down thicknesses of the first up-down urging rubber and the second up-down urging rubber, and the connection-insert section is inserted into the connection groove in the lateral direction beyond the lock protrusion and urged to the second side by the first up-down urging rubber so that the connection-insert section is locked in the lock protrusion so as to avoid extraction thereof from the connection groove, in a state where the connection-insert section is positioned relative to the connection groove in the up-down direction by the first up-down urging rubber and the second up-down urging rubber.

According to the eighth mode, in the structure where the vibration-damping device main body is inserted into the bracket in the lateral direction, when the connection-insert section of the vibration-damping device main body is inserted into the connection groove of the bracket beyond the lock protrusion, the first up-down urging rubber and the second up-down urging rubber undergo elastic deformation, thereby eliminating the need of deformation for the connection-insert section and the connection groove. This avoids the connection-insert section and the connection groove from being damaged in the insertion of the connection-insert section into the connection groove, thereby improving the durability.

Besides, the connection-insert section is inserted into the connection groove beyond the lock protrusion and then urged to the second side of the upper and lower sides by elasticity of the first up-down urging rubber compressed between the connection-insert section and the connection groove in the up-down direction. As a result, the displacement of the connection-insert section relative to the connection groove in the extraction side is limited by locking of the connection-insert section and the lock protrusion. This prevents separation of the vibration-damping device main body and the bracket, which results from the extraction of the connection-insert section out of the connection groove, thereby improving the reliability.

Moreover, the second up-down urging rubber is fixed on the lower surface of the connection-insert section. Owing to this, when the connection-insert section is sliding beyond the lock protrusion, the second up-down urging rubber undergoes large compression deformation partially, i.e., in a part located on the lock protrusion. This reduces resistance to the insertion of the connection-insert section into the connection groove, thereby facilitating assembly work of the vibration-damping device main body and the bracket.

Furthermore, both the upper and lower surfaces of the connection-insert section are covered by the first up-down urging rubber and the second up-down urging rubber. In the insertion of the connection-insert section into the connection groove beyond the lock protrusion, these rubbers prevent damages that might be caused by direct contact between the up-down outer surface of the connection-insert section and the up-down inner surface of the connection groove, while avoiding galling, which may lead to difficulty in the insertion.

A ninth mode of the present invention provides the bracket-equipped vibration-damping device according to the eighth mode, wherein the first up-down urging rubber is thicker than the second up-down urging rubber in the up-down direction.

The ninth mode makes it easier to set the up-down compression deformation amount of the first up-down urging rubber to be larger than that of the second up-down urging rubber in the connection-insert section sliding over the lock protrusion. The connection-insert section, after being inserted into the connection groove beyond the lock protrusion, is more easily displaced further to the side of the second up-down urging rubber in the up-down direction than during sliding over the lock protrusion. As a result, the connection-insert section, which has already slid beyond the lock protrusion, tends to overlap the lock protrusion with a greater area when viewed in the front-back direction of the insertion direction. The locking of the connection-insert section and the connection groove can prevent the extraction of the connection-insert section from the connection groove.

The first up-down urging rubber and the second up-down urging rubber may be formed integrally with one another with a rubber material of the same spring characteristics. In relation to the rubbers formed thus and otherwise, differentiating the thicknesses of the first up-down urging rubber and the second up-down urging rubber from each other enables easy adjustment of the up-down position of the connection-insert section inserted in the connection groove.

A tenth mode of the present invention provides the bracket-equipped vibration-damping device according to the ninth mode, wherein the first up-down urging rubber is fixed on an upper surface of the connection-insert section, while the second up-down urging rubber is fixed on a lower surface of the connection-insert section.

According to the tenth mode, for example, under distributed load being input downward from the components of the vibration transmission system or the like on the vibration-damping device main body, stable reception of the distributed load is allowed by the second up-down urging rubber whose up-down thickness is thin. Besides, the deformation amount of the second up-down urging rubber by the action of the distributed load is comparatively small. This improves the durability of the second up-down urging rubber, while more readily avoiding rattling of the vibration-damping device main body and the bracket due to sinkage of the second up-down urging rubber.

An eleventh mode of the present invention provides the bracket-equipped vibration-damping device according to the eighth mode, wherein a protruding tip face of the lock protrusion is an incline relative to the insertion direction so that the protrusion dimension of the lock protrusion is gradually smaller as it goes backward in the insertion direction.

According to the eleventh mode, since the up-down dimension of the back face of the lock protrusion is small, the connection-insert section more readily slides beyond the lock protrusion to the insertion side. Also, since the up-down dimension of the front face of the lock protrusion is large, retainment is effectively realized by locking of the lock protrusion in the connection-insert section after sliding beyond the lock protrusion. Consequently, it is possible to prevent the connection-insert section from sliding beyond the lock protrusion toward the extraction side.

A twelfth mode of the present invention provides the bracket-equipped vibration-damping device according to the eighth mode, further comprising: a front-back urging rubber fixed on a front surface of the connection-insert section in the insertion direction; and a front wall provided for the bracket that obstructs a front end of the connection groove in the insertion direction so that the front-back urging rubber is compressed in a front-back direction of the insertion direction between the connection-insert section and the front wall.

According to the twelfth mode, the connection-insert section is urged to the extraction side (the back side of the insertion direction) by elasticity of the urging rubber compressed in the front-back direction of the insertion direction. This abuts the connection-insert section on the lock protrusion of the connection groove in the extraction direction. By so doing, the connection-insert section is positioned within the connection groove on both front and back sides in the insertion direction. Additionally, this avoids noise resulting from contact of separated connection-insert section and lock protrusion.

According to the present invention, the up-down urging rubber is fixed on either of the upper and lower surfaces of the connection-insert section of the vibration-damping device main body. Upon inserting the connection-insert section into the connection groove of the bracket beyond the lock protrusion, the up-down urging rubber undergoes elastic deformation. This eliminates the need of deformation of the connection-insert section and the connection groove, thereby improving the durability. In addition, the connection-insert section, which is inserted into the connection groove beyond the lock protrusion, is urged to the other side of the upper and lower sides by the elasticity of the up-down urging rubber compressed in the up-down direction between the connection-insert section and the connection groove. Consequently, the lock protrusion limits displacement of the connection-insert section to the extraction side out of the connection groove.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
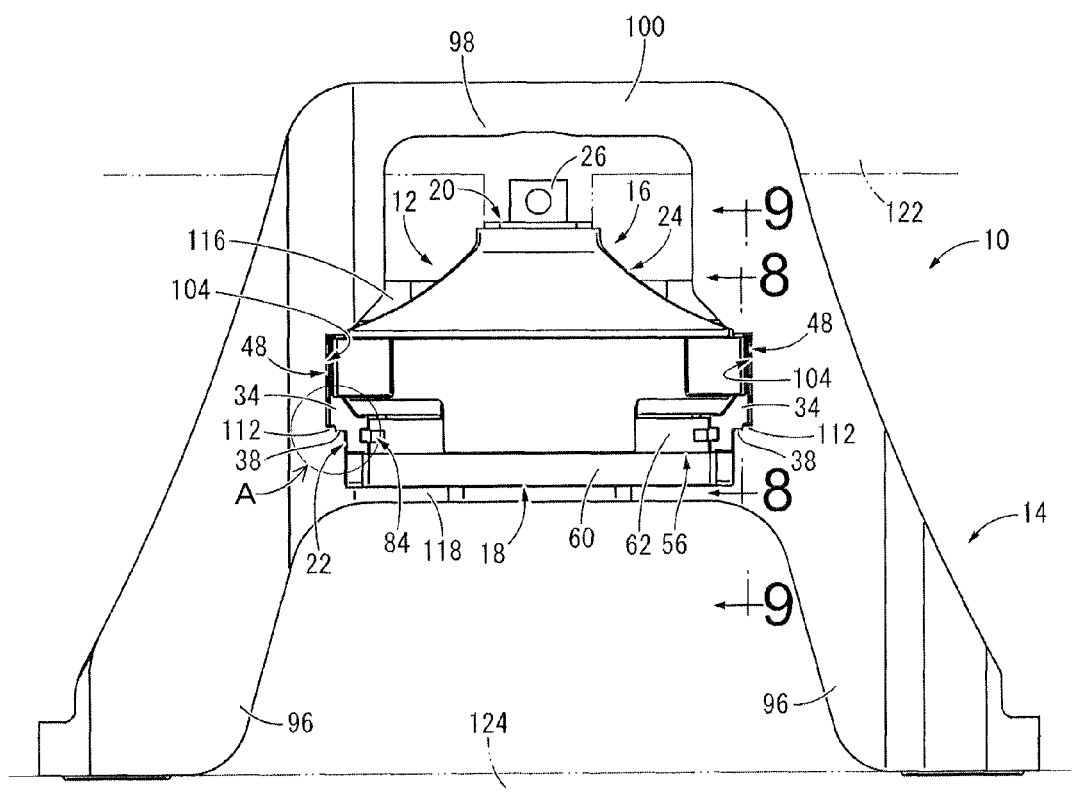
FIG. 1 is a rear view showing a bracket-equipped vibration-damping device in the form of an engine mount as a first embodiment of the present invention.

There will be described an embodiment of the present invention while referring to the drawings.

Figure 2:
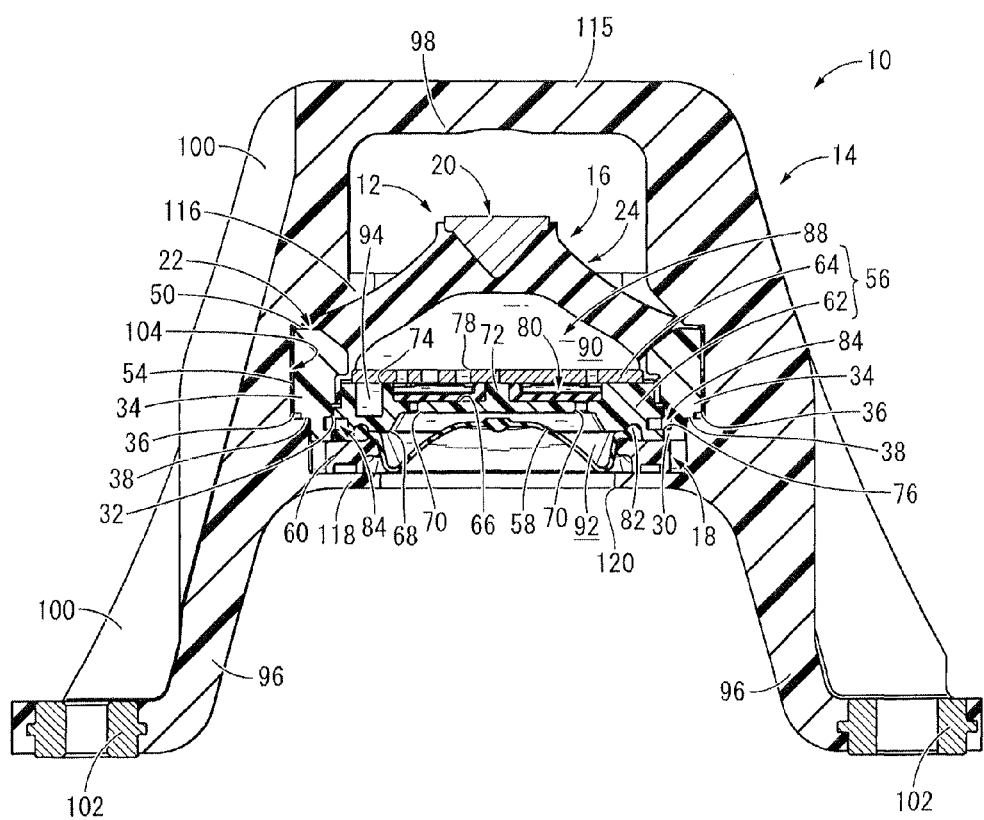
FIG. 2 is a longitudinal cross sectional view of the engine mount shown in FIG. 1.

FIGS. 1 and 2 show an automotive engine mount 10 as a first embodiment of a bracket-equipped vibration-damping device constructed according to the present invention. The engine mount 10 has a structure wherein a mount main body 12 as a vibration-damping device main body is attached to a bracket 14 such that it is inserted in the lateral direction into the bracket 14. In the explanation hereinafter, as a general rule, the up-down direction is the up-down direction in FIG. 1, which is the direction of the mount central axis, the front-back direction is the direction orthogonal to the paper face of FIG. 1, and the left-right direction is the left-right direction in FIG. 1, respectively.

Figure 3:
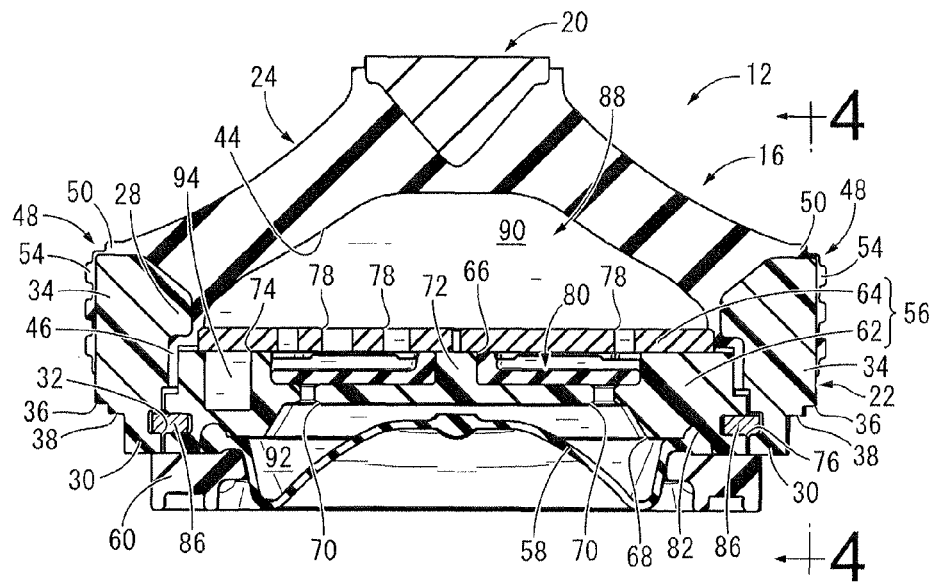
FIG. 3 is an enlarged longitudinal cross sectional view of a mount main body constituting the engine mount shown in FIG. 1, taken along line 3-3 of FIG. 4.
Figure 4:
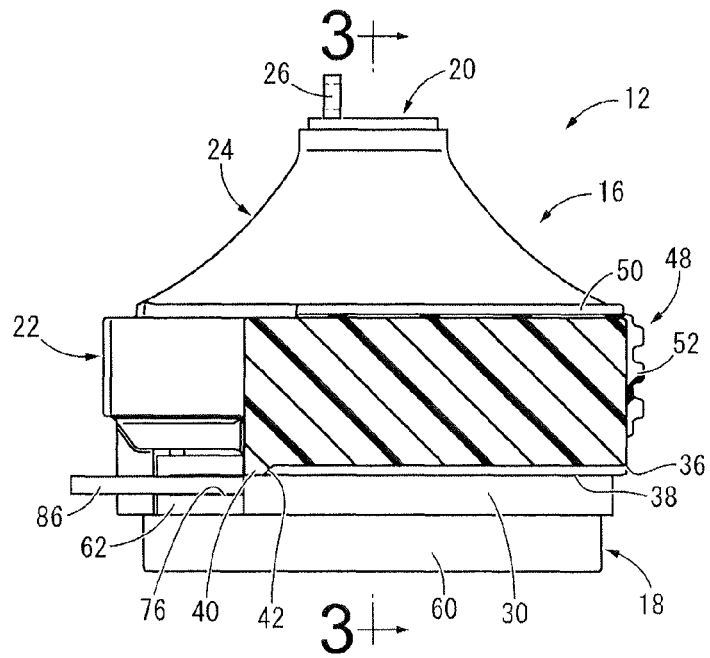
FIG. 4 is a cross sectional view taken along line 4-4 of FIG. 3.

More specifically, the mount main body 12, as shown in FIGS. 3 and 4, comprises an integrally vulcanization molded component 16 and a fluid-filled assembly 18, which are combined. The integrally vulcanization molded component 16 has a structure wherein a first mounting member 20 and a second mounting member 22 are elastically linked by a main rubber elastic body 24.

The first mounting member 20 is a member of high rigidity formed of a metal, a synthetic resin, or the like having a solid shape of a cone or truncated cone inverted in the up-down direction, a circular post, or the like. With the first mounting member 20, an attachment piece 26 is integrally formed so as to project upward and have a bolt hole penetrating therethrough in the front-back direction.

The second mounting member 22 is a member of high rigidity formed of a metal, a synthetic resin, or the like whose whole shape is roughly a rectangular tube. Additionally, with the second mounting member 22, a seal protuberance 28 is integrally formed sticking out to the inner periphery. For the seal protuberance 28, the upper face has a tapered shape and the lower face expands roughly in the axis-perpendicular direction.

Figure 5:
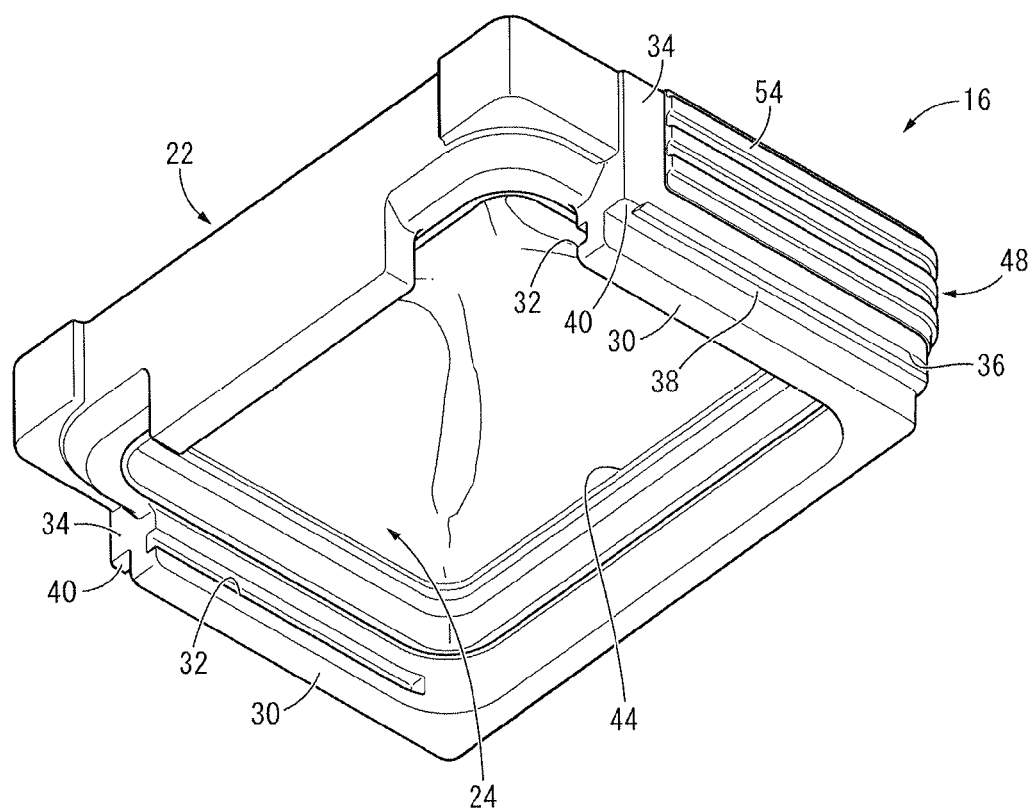
FIG. 5 is a perspective view of an integrally vulcanization molded component of the mount main body shown in FIG. 3.

At each of the left and right sides of the second mounting member 22, an engaging part 30 is formed projecting downward. As FIG. 5 shows, this engaging part 30 is formed at a location biased forward so that the back end of the engaging part 30 (the left end in FIG. 4) is located on the front side (the right side in FIG. 4) of the back end of the second mounting member 22. On each of the engaging parts 30, 30 of the second mounting member 22, an outer groove 32 is formed opening inward in their facing direction and extending in the front-back direction. The engaging parts 30, 30 of this embodiment are reinforced by mutual connection of their front ends.

For each of the left and right sides of the second mounting member 22, a connection-insert section 34 is provided protruding outward in the left-right direction. This connection-insert section 34 has a shape of a solid substantially-rectangular block extending in the front-back direction. On the lower surface of the connection-insert section 34 at the outside in the left-right direction, a notch 36 is formed opening downward and outward in the left-right direction while extending in the front-back direction. For the lower surface of the connection-insert section 34, the inside portion apart from the notch 36 in the left-right direction is a flat support surface 38 expanding in the axis-perpendicular direction. The notch may extend in the front-back direction opening downward at the left-right middle portion of the connection-insert section 34, for example. This enables formation of the support surface in the lower surface of the connection-insert section 34 on both sides of the notch apart therefrom in the left-right direction.

Additionally, a detent projection 40 is formed in the connection-insert section 34 on the back side of the notch 36. The detent projection 40 projects further downward than the upper base face of the notch 36. In this embodiment, the lower face of the detent projection 40 and the support surface 38 are substantially the same plane. Moreover, the front end face of the detent projection 40, or the back end face of the notch 36 in other words, is a guide slope 42, which slants backward as it goes downward like FIG. 4 shows.

As FIGS. 2 and 3 show, the first mounting member 20 and the second mounting member 22 are disposed substantially co-axially and separately in the up-down direction, having the main rubber elastic body 24 formed in between. The main rubber elastic body 24 is a rubber elastic body whose substantial shape is a truncated quadrangular pyramid, wherein, to the small diameter side end, the first mounting member 20 is vulcanization bonded with the lower part of the first mounting member 20 buried therein, while to the large diameter side end, the upper part of the second mounting member 22 is vulcanization bonded as overlapped therewith.

In the main rubber elastic body 24, a large diameter recess 44 is formed to be concave in a rectangular shape and open to the lower face. This large diameter recess 44 is a tapered concavity expanding as it goes to the opening side, or downward, for which the upper base wall in the diametrical center part has a plane shape expanding substantially in the axis-perpendicular direction. Note that both the lower end face of the first mounting member 20 and the inner peripheral face of the upper part of the second mounting member 22 are covered with the main rubber elastic body 24 so that neither of these first mounting member 20 and second mounting member 22 is exposed to the inner face of the large diameter recess 44.

The lower part of the second mounting member 22 located further downward than the opening of the large diameter recess 44 is covered with a seal rubber layer 46, which is formed integrally with the main rubber elastic body 24. The seal rubber layer 46 is fixed also to the lower face of the seal protuberance 28 of the second mounting member 22. Note that the seal rubber layer 46 fails to reach the engaging parts 30 of the second mounting member 22 so that the engaging parts 30 are exposed from the main rubber elastic body 24.

Besides, to the connection-insert section 34 of the second mounting member 22, a positioning rubber 48 is fixed. The positioning rubber 48 is formed integrally with the main rubber elastic body 24, while integrally including an up-down urging rubber 50, a front-back urging rubber 52, and a left-right urging rubber 54. The up-down urging rubbers 50 are fixed on the upper surfaces of the connection-insert sections 34, while they are integrally connected to the front-back urging rubbers 52 and the left-right urging rubbers 54 by thin rubber layers. Moreover, the up-down urging rubber 50 is provided on the front side of the detent projection 40. In the present embodiment, the back end of the up-down urging rubber 50 is positioned to be separate forward from the front end of the detent projection 40 by a prescribed distance. The front-back urging rubber 52 and the left-right urging rubber 54 have a structure of three convex ridges arranged in the up-down direction as parallel being integrally connected to each other by thin rubber layers. The front-back urging rubber 52, which is fixed to the front surface of the connection-insert section 34, and the left-right urging rubber 54, which is fixed to the left-right outer surface of the connection-insert section 34, are provided to be continuous along the outer surface of the connection-insert section 34.

Meanwhile, the fluid-filled assembly 18 has a structure wherein a partition member 56, a flexible film 58, and a pressing member 60 are integrally connected, as FIG. 3 shows.

The partition member 56 comprises a partition member main body 62 and a lid plate member 64 which are superposed and fixed to each other in the up-down direction. The partition member main body 62 is a rigid member formed of a synthetic resin or a metal in a substantially rectangular plate shape. The inner peripheral part of the partition member main body 62, with a housing concavity 66 formed opening to its upper face and a lightening concavity 68 formed opening to its lower face, is thinner in the up-down direction than the outer peripheral part thereof. Additionally, in the bottom wall of the housing concavity 66 of the partition member main body 62, a plurality of lower through holes 70 are formed penetrating therethrough in the up-down direction. At the center of the housing concavity 66, a central connecting part 72 is provided protruding upward from the bottom face with a substantially circular post shape.

In the thick outer peripheral part of the partition member main body 62, a peripheral groove 74 is formed opening to the upper face and extending in the peripheral direction. This peripheral groove 74 extends on the outer peripheral side of the housing concavity 66 by a prescribed length that is shorter than one periphery.

Furthermore, in the outer peripheral part of the partition member main body 62, inner grooves 76 are formed. The inner grooves 76, which open to the left-right outer faces of the partition member main body 62, are formed to be continuous along the whole front-back length of the partition member main body 62.

For the lid plate member 64 having a substantial shape of a thin rectangular plate, the portion that covers the housing concavity 66 when being fixed to the partition member main body 62 as described later has a plurality of upper through holes 78 formed therethrough in the up-down direction.

The lid plate member 64 is superposed to the upper face of the partition member main body 62, and then these partition member main body 62 and lid plate member 64 are fixed to one another by means of using a not-shown screw, welding, or the like. By overlapping the partition member main body 62 and the lid plate member 64, the opening of the housing concavity 66 of the partition member main body 62 is covered by the lid plate member 64. This disposes a movable film 80, which is to be housed in the housing concavity 66 of the partition member main body 62, between the partition member main body 62 and the lid plate member 64 in the up-down direction. This movable film 80, which has a substantially annular plate shape whose inner peripheral rim protrudes upward, is disposed externally about the central connecting part 72 of the partition member main body 62. With the inner peripheral rim clamped in the up-down direction between the partition member main body 62 and the lid plate member 64, the movable film 80 is supported by the partition member 56.

The flexible film 58, which is a thin rubber film having a substantially-rectangular dome shape with a slack in the up-down direction, can deform easily in the thickness direction. Besides, on the outer peripheral rim of the flexible film 58, a thick clamped part 82 is integrally formed as continuous along the entire periphery.

The pressing member 60 has a substantial shape of a rectangular frame, wherein the inner peripheral part is thinned out in the up-down direction compared to the outer peripheral part and provided to be biased upward.

The partition member 56, the flexible film 58, and the pressing member 60 of this structure are superposed and joined to one another in the up-down direction to constitute the fluid-filled assembly 18. Specifically, for example, a junction protrusion provided for either one of the partition member main body 62 and the pressing member 60 is inserted through a junction hole formed in the other of the partition member main body 62 and the pressing member 60. After that, the protruding tip of the junction protrusion is expanded in diameter by laser heating or the like, thereby joining and fixing the partition member 56 and the pressing member 60 to each other. However, the fixing method for the partition member main body 62 and the pressing member 60 is not limited by the example shown above and can be realized also by screwing or welding, for example. By the clamped part 82 of the flexible film 58 being clamped in the up-down direction between the outer peripheral part of the partition member main body 62 and the inner peripheral part of the pressing member 60, the outer peripheral rim of the flexible film 58 is clamped by the partition member 56 and the pressing member 60. Consequently, those partition member 56, flexible film 58, and pressing member 60 are joined to each other. The outer peripheral rim of the flexible film 58 is clamped continuously along the entire periphery between the partition member main body 62 and the pressing member 60, whereby the gap between the overlapped faces of the partition member main body 62 and the pressing member 60 is sealed in a ring shape.

As FIG. 3 shows, the fluid-filled assembly 18 is mounted to the integrally vulcanization molded component 16 such that the partition member 56 is inserted in the second mounting member 22. As a result, the partition member 56 is overlapped with the second mounting member 22 as viewed in the axis-perpendicular direction. In this embodiment, the outer peripheral face of the partition member 56 is superposed to the inner peripheral face of the second mounting member 22.

Between the inner peripheral face of the second mounting member 22 and the outer peripheral face of the partition member 56 that are superposed, pin insertion holes 84 that extend in the front-back direction are formed by the outer grooves 32 of the second mounting member 22 and the inner grooves 76 of the partition member main body 62. Inserting positioning pins 86 into the pin insertion holes 84 positions the second mounting member 22 and the partition member 56 relative to each other in the axial direction.

The pin insertion holes 84 of this embodiment have a substantially rectangular cross section, and a pair of them, which are mutually separate, are provided on both left and right sides. Each of these pin insertion holes 84, 84 on the both left and right sides extends like a straight line in the front-back direction. In the present embodiment, the up-down width dimension of the opening inside in the left-right direction of the outer groove 32 is larger than the up-down width dimension of the opening outside in the left-right direction of the inner groove 76. Also for this embodiment, the depth dimension of the outer groove 32 formed in the second mounting member 22 made of a metal is smaller than the depth dimension of the inner groove 76 formed in the partition member main body 62 made of a synthetic resin. Moreover, the front-back length of the outer groove 32 is shorter than the front-back length of the inner groove 76, and the back end of the outer groove 32 is positioned further forward than the back end of the inner groove 76.

As FIGS. 3 and 4 show, inserting the positioning pins 86, 86 into the pin insertion holes 84, 84 locks the second mounting member 22 and the partition member 56 with respect to the positioning pins 86, 86 in the axial direction, thereby positioning the second mounting member 22 and the partition member 56 relatively in the axial direction using the positioning pins 86. Specifically, the outside portions in the left-right direction of the positioning pins 86, 86 are inserted into the outer grooves 32 of the second mounting member 22, while the inside portions in the left-right direction of the positioning pins 86, 86 are inserted into the inner grooves 76 of the partition member 56. Since the back ends of the outer grooves 32 are positioned further forward than the back ends of the inner grooves 76, the positioning pins 86, 86 are inserted into the inner grooves 76 and then into the outer grooves 32.

The positioning pins 86, 86 are thus inserted into the pin insertion holes 84, 84, so that the second mounting member 22 and the partition member 56 are positioned at an appropriate axial position relative to one another. Consequently, the seal rubber layer 46, which is fixed on the second mounting member 22, is clasped between the second mounting member 22 and the partition member 56, thereby keeping fluid-tight sealing of the gap between those second mounting member 22 and partition member 56. Especially since the second mounting member 22 and the partition member 56 are relatively positioned in the axial direction, the seal rubber layer 46 is compressed in the up-down direction between the seal protuberance 28 of the second mounting member 22 and the upper face of the partition member 56, thereby sealing the gap between the second mounting member 22 and the partition member 56. In sum, by axial locking in the positioning pins 86, 86 inserted in the pin insertion holes 84, 84, the second mounting member 22 and the partition member 56 are relatively positioned at a sealing position where the gap in between is sealed fluid-tightly.

By mounting the fluid-filled assembly 18 to the integrally vulcanization molded component 16, a fluid chamber 88 that is fluid-tightly separated from the outside is formed between the main rubber elastic body 24 and the flexible film 58 in the axial direction. For this fluid chamber 88, a portion of its wall is constituted by the main rubber elastic body 24, while another portion of its wall is constituted by the flexible film 58, and a non-compressible fluid or liquid is sealed therein. Note that the non-compressible fluid to be filled in the fluid chamber 88, i.e., the sealed fluid, is not particularly limited, although preferably adopted are water, ethylene glycol, propylene glycol, alkylene glycol, polyalkylene glycol, silicone oil, and a mixture liquid thereof, for example. In addition, the sealed fluid is desirably a low-viscosity fluid so as to advantageously obtain vibration-damping effect based on the flowing action of the fluid, which will be described later. That is, more preferably adopted is a low-viscosity fluid having viscosity of 0.1 Pa·s or lower.

The partition member 56 is disposed to expand substantially in the axis-perpendicular direction in the fluid chamber 88, so that the fluid chamber 88 is divided in two in the up-down direction by the partition member 56. Consequently, formed on the upper side of the partition member 56 is a pressure-receiving chamber 90 whose wall is partially constituted by the main rubber elastic body 24 for which a vibration input in the up-down direction causes internal pressure fluctuation. On the other hand, formed on the lower side of the partition member 56 is an equilibrium chamber 92 whose wall is partially constituted by the flexible film 58, which allows capacity change and keeps substantially constant internal pressure. The filling of the non-compressible fluid into the pressure-receiving chamber 90 and the equilibrium chamber 92 is realized for example by performing the connection work for the integrally vulcanization molded component 16 and the fluid-filled assembly 18 using the positioning pins 86, 86 in a cistern filled with the non-compressible fluid. However, it is also possible to inject the non-compressible fluid into the pressure-receiving chamber 90 and the equilibrium chamber 92 with a syringe etc. after connecting the integrally vulcanization molded component 16 and the fluid-filled assembly 18 by the positioning pins 86, 86 in a fluid-tight manner.

In the partition member 56, an orifice passage 94 is formed to communicate the pressure-receiving chamber 90 and the equilibrium chamber 92 with one another. The upper opening of the peripheral groove 74 that is formed in the partition member main body 62 is covered by the lid plate member 64 to form a tunnel-shaped passage. This passage is communicated with the pressure-receiving chamber 90 through a not-shown upper communication hole formed in the lid plate member 64 at one end, and with the equilibrium chamber 92 through a not-shown lower communication hole formed in the partition member main body 62 at the other end, thereby forming the orifice passage 94. The tuning frequency of this orifice passage 94, which is the resonance frequency of the flowing fluid, is set to a frequency corresponding to the low-frequency vibration such as engine shake, by adjusting the ratio (A/L) of the passage cross sectional area A to the passage length L considering the wall spring rigidity of the fluid chamber 88. An input of axial vibration of the low frequency to which the orifice passage 94 is tuned causes relative pressure fluctuation between the pressure-receiving chamber 90 and the equilibrium chamber 92, so that the sealed fluid flows between the pressure-receiving chamber 90 and the equilibrium chamber 92 via the orifice passage 94 in a resonant state. This exerts the vibration-damping effect based on the flow action such as the resonance action of the fluid, namely high attenuating or damping action.

On the upper face of the movable film 80 of the partition member 56, the liquid pressure of the pressure-receiving chamber 90 is exerted via the upper through holes 78, while on the lower face thereof, the liquid pressure of the equilibrium chamber 92 is exerted via the lower through holes 70. Consequently, when a large load input lowers the liquid pressure in the pressure-receiving chamber 90 markedly in relation to the liquid pressure in the equilibrium chamber 92, the movable film 80 undergoes elastic deformation and is spaced from the bottom face of the housing concavity 66. This opens the lower through holes 70, which have been covered by the movable film 80, thereby communicating the pressure-receiving chamber 90 and the equilibrium chamber 92 with one another via the upper through holes 78, the housing concavity 66, and the lower through holes 70. As a result, negative pressure of the pressure-receiving chamber 90 is decreased or eliminated as rapidly as possible, thereby avoiding cavitation bubbles and hence noise resulting from cavitation. Note that it is also possible to adopt such a structure that upon input of a vibration with a higher frequency than the tuning frequency of the orifice passage 94, vibration-damping effect (vibration isolation action) is exerted based on liquid pressure transmission between the pressure-receiving chamber 90 and the equilibrium chamber 92 owing to the elastic deformation of the movable film.

Figure 6:
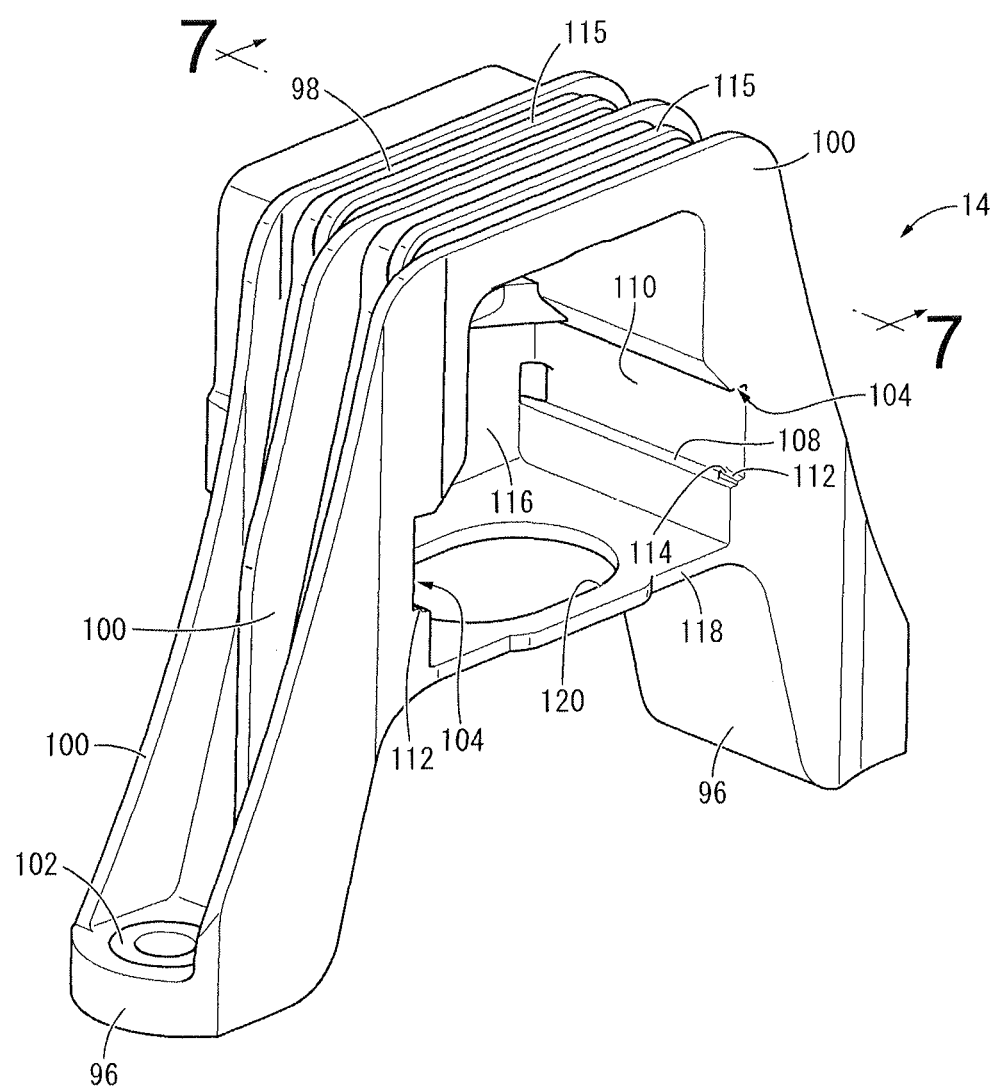
FIG. 6 is a perspective view of a bracket of the engine mount shown in FIG. 1.

To the mount main body 12 of this structure, the bracket 14 is attached. The bracket 14 is a member of high rigidity formed of a material including a metal like an aluminum alloy and a fiber-reinforced synthetic resin. As FIGS. 2 and 6 show, the bracket 14 integrally includes left and right mounting legs 96, 96 extending in the up-down direction and a top plate 98 integrally connecting the upper edges of the left and right mounting legs 96, 96.

The left and right mounting legs 96, 96, which have a thick plate shape with a prescribed width dimension in the front-back direction, are disposed to face each other in the left-right direction. Additionally, for the mounting legs 96, a reinforcing rib 100 is integrally formed with each of both front-back edges and front-back intermediate portion thereof so as to protrude outward in the left-right direction. The lower edges of the left and right mounting legs 96, 96 have a shape of a plate expanding outward in the left-right direction, and a mounting nut 102 is fixed on each of them.

Each of the left and right mounting legs 96, 96 of the bracket 14 has a connection groove 104 extending in the front-back direction while opening inward in the facing direction. This connection groove 104 has a groove shape roughly corresponding to the connection-insert section 34 of the second mounting member 22. More specifically, in the connection groove 104, an upper inner surface 106 and a lower inner surface 108 as groove side wall inner surfaces, each of which is a plane expanding in the axis-perpendicular direction, face one another as spaced apart therefrom with a prescribed distance in the up-down direction. Meanwhile, a left-right inner surface 110 as a groove base inner surface is a plane expanding in the up-down direction and in the front-back direction, which is continuous to the upper inner surface 106 and the lower inner surface 108.

The groove width dimension of the connection groove 104 (the up-down distance between the upper inner surface 106 and the lower inner surface 108) is smaller than the total value of the up-down thickness dimension of the connection-insert section 34 and the up-down thickness dimension of the up-down urging rubber 50 in a single mount main body 12 before attachment of the bracket 14.

Figure 7:
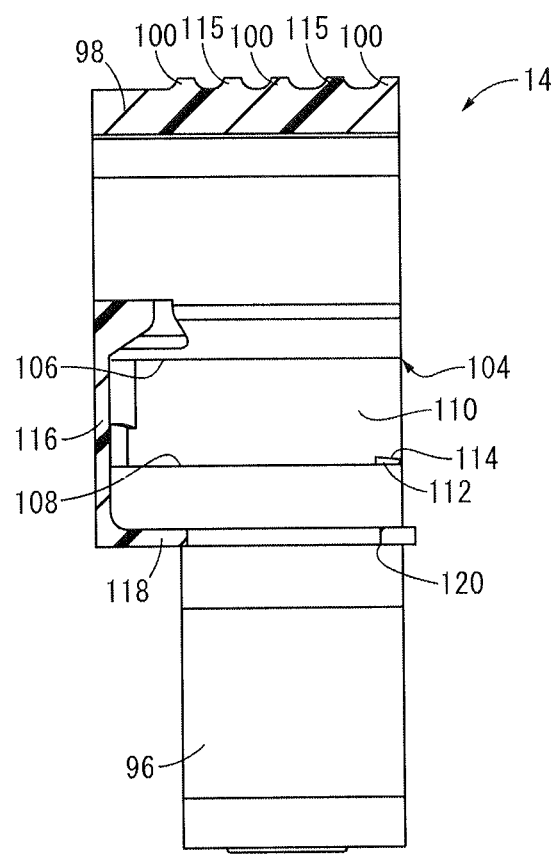
FIG. 7 is a cross sectional view taken along line 7-7 of FIG. 6.

On each of the left and right mounting legs 96, 96, a lock protrusion 112 is formed. As FIGS. 6 and 7 show, the lock protrusion 112 protrudes upward from the lower inner surface 108 in the back end of the connection groove 104. The lock protrusion 112 is formed partially in the left-right direction that is the groove depth direction of the connection groove 104, and disposed in the outside portion in the left-right direction in the present embodiment, as shown in FIGS. 1 and 6. Moreover, the lock protrusion 112 is formed with the left-right dimension corresponding to the notch 36 of the second mounting member 22. The protrusion dimension of the lock protrusion 112 is gradually smaller as it goes backward and the protruding tip face (the upper face) thereof is an incline 114 that slants downward as it goes backward.

The protrusion height of the front end of the lock protrusion 112 (the maximum protrusion height) is smaller than the thickness dimension of the up-down urging rubber 50 that covers the upper surface of the connection-insert section 34, while it is the same as or smaller than the up-down depth of the notch 36. Besides, the distance in the front-back direction between the opposite faces of the lock protrusion 112 and a front wall 116, which will be described later, is longer than the front-back length of the connection-insert section 34 and shorter than the distance between the back end of the connection-insert section 34 and the front end of the front-back urging rubber 52.

With the upper edges of the left and right mounting legs 96, 96, the top plate 98 is integrally formed. The shape of the top plate 98 is a plate extending in the left-right direction with a prescribed width in the front-back direction. The reinforcing rib 100 is formed protruding upward on each of both front-back edges and front-back intermediate portion of the top plate 98. Between these reinforcing ribs 100, 100, 100 in the front-back direction, reinforcing ribs 115 are integrally formed respectively.

With the front edges of the left and right mounting legs 96, 96, the front wall 116 is integrally formed. The front wall 116 whose shape is a plate extending in the left-right direction is disposed to be separated downward from the top plate 98, while the left and right mounting legs 96, 96 are integrally linked by the front wall 116. This front wall 116 obstructs the front ends of the connection grooves 104 formed in the left and right mounting legs 96, 96, although passage holes, which pass in the front-back direction through the linkage parts of the left and right outer ends of the front wall 116 and the left and right mounting legs 96, 96, are communicated with the connection grooves 104. The passage holes are formed penetrating in the front-back direction through the both left and right ends of the front wall 116, so that the front ends of the connection grooves 104 are obstructed while being communicated with the front side at the passage holes.

Between the opposite faces of the left and right mounting legs 96, 96, a bottom plate 118 is integrally formed therewith. The bottom plate 118, in a plate shape extending in the left-right direction with a prescribed width in the front-back direction, is disposed to face the top plate 98 in the up-down direction. The bottom plate 118 integrally links the up-down intermediate parts of the left and right mounting legs 96, 96 and the lower end of the front wall 116 to each other. Moreover, in the bottom plate 118, a window 120 is formed therethrough in the up-down direction for permitting the deformation of the flexible film 58. Note that the bottom plate 118 is provided on the lower side of the connection grooves 104.

The bracket 14 is mounted on the mount main body 12. Specifically, into the area surrounded by the left and right mounting legs 96, 96, the top plate 98, and the bottom plate 118 in the bracket 14, the mount main body 12 is inserted from the back side in the lateral direction. The connection-insert sections 34, 34 of the second mounting member 22 of the mount main body 12 are inserted into the connection grooves 104, 104 of the bracket 14, so that the bracket 14 is mounted on the mount main body 12.

Figure 8:
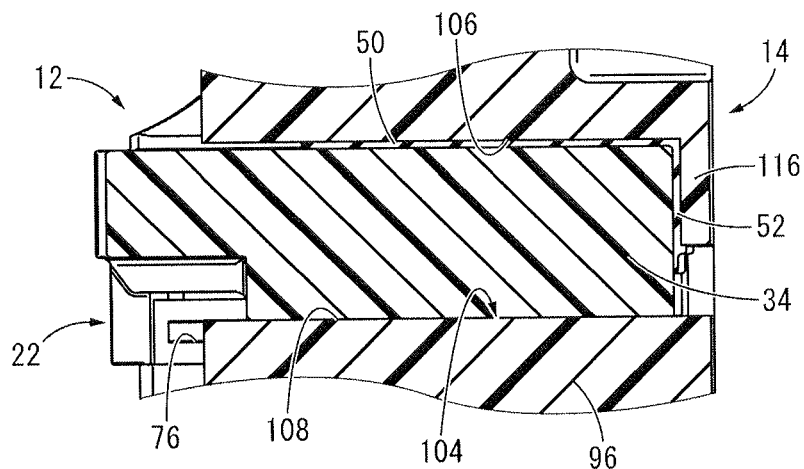
FIG. 8 is a cross sectional view taken along line 8-8 of FIG. 1.

More specifically, when the connection-insert section 34 is inserted in the connection groove 104, as FIG. 8 shows, the left-right inside portion of the connection-insert section 34, on which the up-down urging rubber 50 is fixed, is clamped in the up-down direction between the upper inner surface 106 and the lower inner surface 108 of the connection groove 104. Owing to this, the second mounting member 22 including the connection-insert sections 34 is positioned relative to the bracket 14 including the connection grooves 104 in the up-down direction. The total value of the up-down thickness dimension of the connection-insert section 34 and the up-down thickness dimension of the up-down urging rubber 50 is larger than the groove width dimension of the connection groove 104. Therefore, when the mount main body 12 is equipped with the bracket 14, the up-down urging rubber 50 is compressed in the up-down direction between the upper surface of the connection-insert section 34 and the upper inner surface 106 of the connection groove 104, which face to each other.

Figure 9:
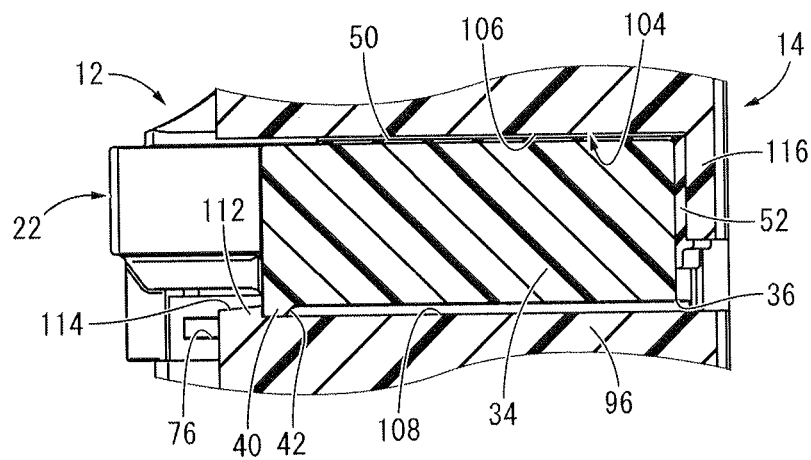
FIG. 9 is a cross sectional view taken along line 9-9 of FIG. 1.

On the other hand, in the left-right outside portion of the connection-insert section 34, the detent projection 40 of the connection-insert section 34 is locked in the lock protrusion 112 of the connection groove 104 in the front-back direction as FIG. 9 shows. This locking prevents dislodgement of the connection-insert section 34 out of the connection groove 104 to the back side. Especially in the present embodiment, the notch 36 is formed in the left-right outside portion of the connection-insert section 34, and the lock protrusion 112 moves backward relative to the second mounting member 22 within the notch 36, thereby facilitating the insertion of the connection-insert section 34 into the connection groove 104. Besides, the detent projection 40 of the connection-insert section 34 is slid into the connection groove 104 beyond the lock protrusion 112, whereby the detent projection 40 is locked in the lock protrusion 112 in the front-back direction.

Here, the up-down thickness dimension of the up-down urging rubber 50 fixed on the upper surface of the connection-insert section 34 is larger than the up-down protrusion height of the lock protrusion 112. Therefore, the detent projection 40 of the connection-insert section 34 slides beyond the lock protrusion 112 owing to compression deformation of the up-down urging rubber 50, and the connection-insert section 34 is inserted into the connection groove 104. Relative locking of the connection-insert section 34 and the connection groove 104 in the up-down direction positions the connection-insert section 34 and the connection groove 104 relative to each other in the up-down direction. As a result, the mount main body 12 and the bracket 14 are relatively positioned in the up-down direction.

Figure 10:
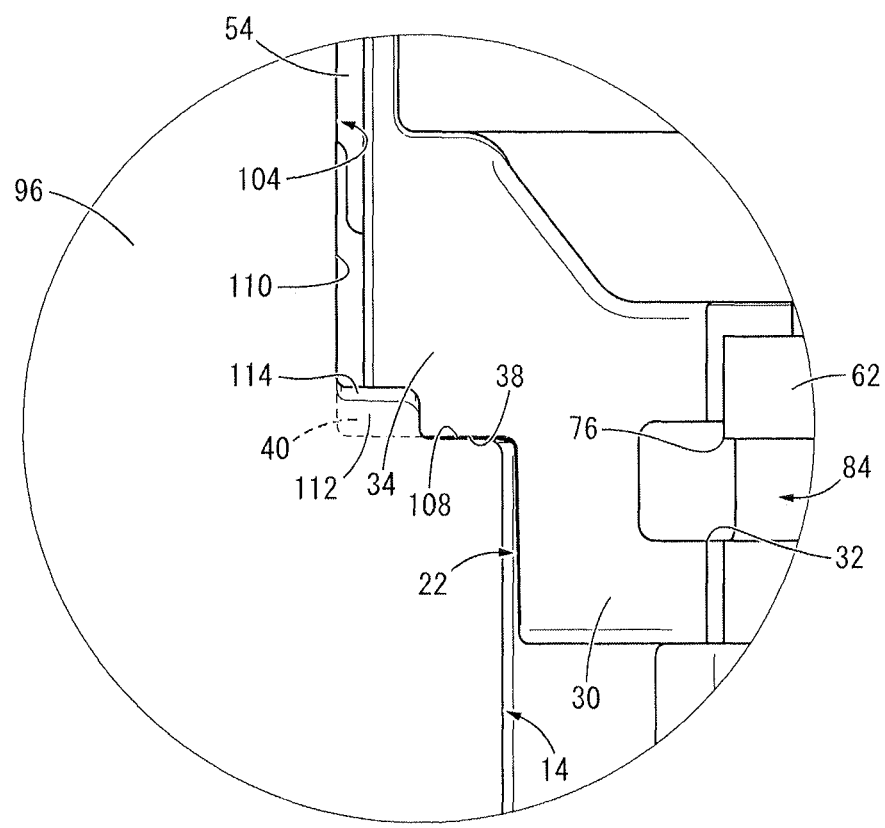
FIG. 10 is a fragmental enlarged view of a principal part, i.e., Part A of FIG. 1.

The connection-insert section 34 inserted in the connection groove 104 beyond the lock protrusion 112 is urged downward by the elasticity of the up-down urging rubber 50 under up-down compression. Then, the detent projection 40 of the connection-insert section 34 inserted further forward than the lock protrusion 112 of the connection groove 104 is overlapped with the lock protrusion 112 as viewed in the front-back direction (see FIGS. 9 and 10). This locks the lock protrusion 112 of the connection groove 104 in the detent projection 40 of the connection-insert section 34 inserted in the connection groove 104 in the front-back direction, thereby avoiding the dislodgement of the connection-insert section 34 out of the connection groove 104.

This structure wherein the detent projection 40 of the connection-insert section 34 slides beyond the lock protrusion 112 owing to the elastic deformation of the up-down urging rubber 50 eliminates the need of deformation with respect to the connection-insert section 34 and the connection groove 104 upon the insertion of the connection-insert section 34 into the connection groove 104. This improves the durability of the second mounting member 22 including the connection-insert sections 34 and the bracket 14 including the connection grooves 104. Especially for the engine mount 10 with the second mounting member 22 and the bracket 14 that are formed of a synthetic resin, damages in the assembly of the second mounting member 22 and the bracket 14 are avoided.

Also in this embodiment, the front face of the detent projection 40 is the guide slope 42 that slants upward as it goes forward, so that abutting the guide slope 42 on the back end of the lock protrusion 112 while applying a force to the insertion side causes an upward force to act on the connection-insert section 34. Consequently, the up-down urging rubber 50 is compressed in the up-down direction between the upper surface of the connection-insert section 34 and the upper inner surface 106 of the connection groove 104, whereby the detent projection 40 easily slides beyond the lock protrusion 112.

Since the protrusion height of the lock protrusion 112 is gradually smaller backward, the detent projection 40 slides beyond the lock protrusion 112 more readily. On the other hand, since the up-down dimension of the front face of the lock protrusion 112 is large, the detent projection 40 located on the front side of the lock protrusion 112 after sliding beyond it is locked in the lock protrusion 112 in the front-back direction with a large area. Thus, the connection-insert section 34 and the connection groove 104 are effectively positioned in the front-back direction. Besides, both the back face of the detent projection 40 and the front face of the lock protrusion 112 expand as roughly orthogonal to the front-back direction. Therefore, the front-back locking of the detent projection 40 and the lock protrusion 112 can effectively avoid the dislodgement of the connection-insert section 34 from the connection groove 104 to the back side.

Furthermore, the up-down urging rubber 50 is provided on the front side of the detent projection 40 in the connection-insert section 34, that is, the up-down urging rubber 50 is not provided on the portion corresponding to the formation part of the detent projection 40 in the up-down thickness direction. By so doing, when the detent projection 40 is sliding beyond the lock protrusion 112, it is possible to tilt the back end side portion in the insertion direction of the connection-insert section 34 as lifting it upward in order to facilitate over sliding. As a result, the attachment work of the bracket 14 to the mount main body 12 gets easier.

The front-back urging rubber 52 fixed on the front surface of the connection-insert section 34 is compressed in the front-back direction between the connection-insert section 34 and the front wall 116, thereby elastically urging the connection-insert section 34 backward in relation to the bracket 14. This abuts the detent projection 40 on the lock protrusion 112 in the front-back direction, thereby relatively positioning the mount main body 12 including the connection-insert sections 34 and the bracket 14 including the connection grooves 104 in the front-back direction. By so doing, it is also possible to avoid separated detent projection 40 and lock protrusion 112 from getting into contact causing noise.

Additionally, in the present embodiment, the left-right urging rubber 54 is fixed on the left-right outer surface of the connection-insert section 34, so that the left-right urging rubber 54 is compressed between the connection-insert section 34 and the left-right inner surface 110 of the connection groove 104. Consequently, the left-right urging rubber 54 allows the error between the distance of the left-right outer surfaces of the left and right connection-insert sections 34, 34 in the mount main body 12 and the distance of the groove base inner surfaces of the left and right connection grooves 104, 104 in the bracket 14, which results from dimensional error of the parts or the like, thereby facilitating the assembly of the mount main body 12 and the bracket 14.

Also, in this embodiment, the lock protrusion 112 is formed in the left-right outside portion of the connection groove 104, while the notch 36 is formed on the front side of the detent projection 40 in the left-right outside portion of the connection-insert section 34. Owing to this, when inserting the connection-insert section 34 into the connection groove 104, the lock protrusion 112 moves within the notch 36. This can prevent increase of frictional resistance caused by the sliding contact of the lock protrusion 112 with the connection-insert section 34, thereby facilitating the insertion of the connection-insert section 34 into the connection groove 104.

The left-right inside portion of the lower inner surface 108 of the connection groove 104 is a flat surface, while the left-right inside portion of the notch 36 in the connection-insert section 34 is the flat support surface 38. When the connection-insert section 34 is inserted into the connection groove 104, the support surface 38 of the connection-insert section 34 slides in contact with the lower inner surface 108 of the connection groove 104. Therefore, the connection-insert section 34 is inserted into the connection groove 104 without tilting, thereby eliminating catching and the like in the insertion.

For this embodiment, the support surface 38 of the connection-insert section 34 is exposed without being covered with a rubber etc., and the connection-insert section 34 directly abuts the groove inner surface of the connection groove 104, in the support surface 38. Consequently, the connection-insert section 34 is more stably positioned in relation to the connection groove 104 in the up-down direction.

As FIG. 1 shows, the engine mount 10 is mounted on the vehicle, by the first mounting member 20 being attached to a power unit 122 as well as the bracket 14, which is fixed to the second mounting member 22, being attached to a vehicle body 124 using the mounting nuts 102. Where the engine mount 10 is mounted on the vehicle, the distributed load of the power unit 122 is exerted downward on the mount main body 12. In this embodiment, the lower surface of the connection-insert section 34 of the mount main body 12 abuts the lower inner surface 108 of the connection groove 104 of the bracket 14 directly without via a rubber or the like. Thus, the distributed load of the power unit 122 is avoided from acting on the positioning rubber 48, thereby improving durability of the positioning rubber 48.

In the present embodiment, as FIG. 2 shows, when the mount main body 12 is mounted on the bracket 14, the second mounting member 22 and the fluid-filled assembly 18 are clamped in the up-down direction between the upper inner surface 106 of the connection groove 104 and the upper face of the bottom plate 118 of the bracket 14. Thus, the second mounting member 22 and the fluid-filled assembly 18 are positioned and retained relative to each other in the up-down direction. Therefore, it is also possible to extract the positioning pins 86, which are inserted between the second mounting member 22 and the partition member 56, from the pin insertion holes 84, while keeping the fluid-tight sealing between the second mounting member 22 and the fluid-filled assembly 18. This enables repeated use of the positioning pins 86.

Figure 11:
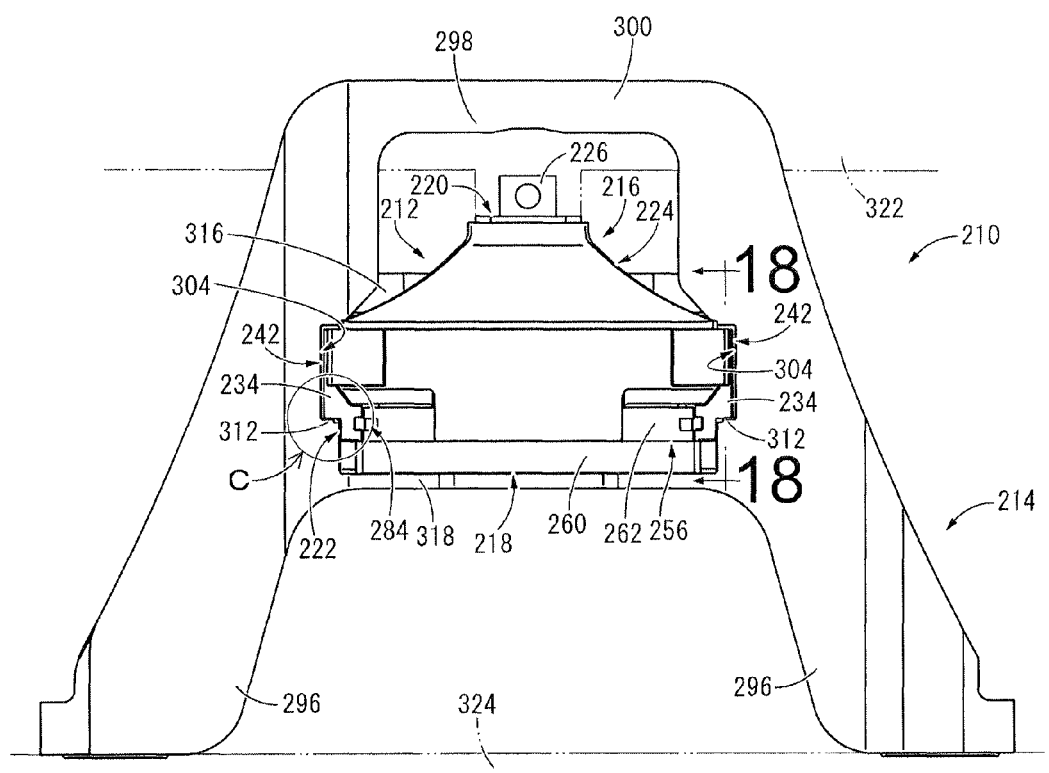
FIG. 11 is a rear view showing an engine mount as a second embodiment of the present invention.
Figure 12:
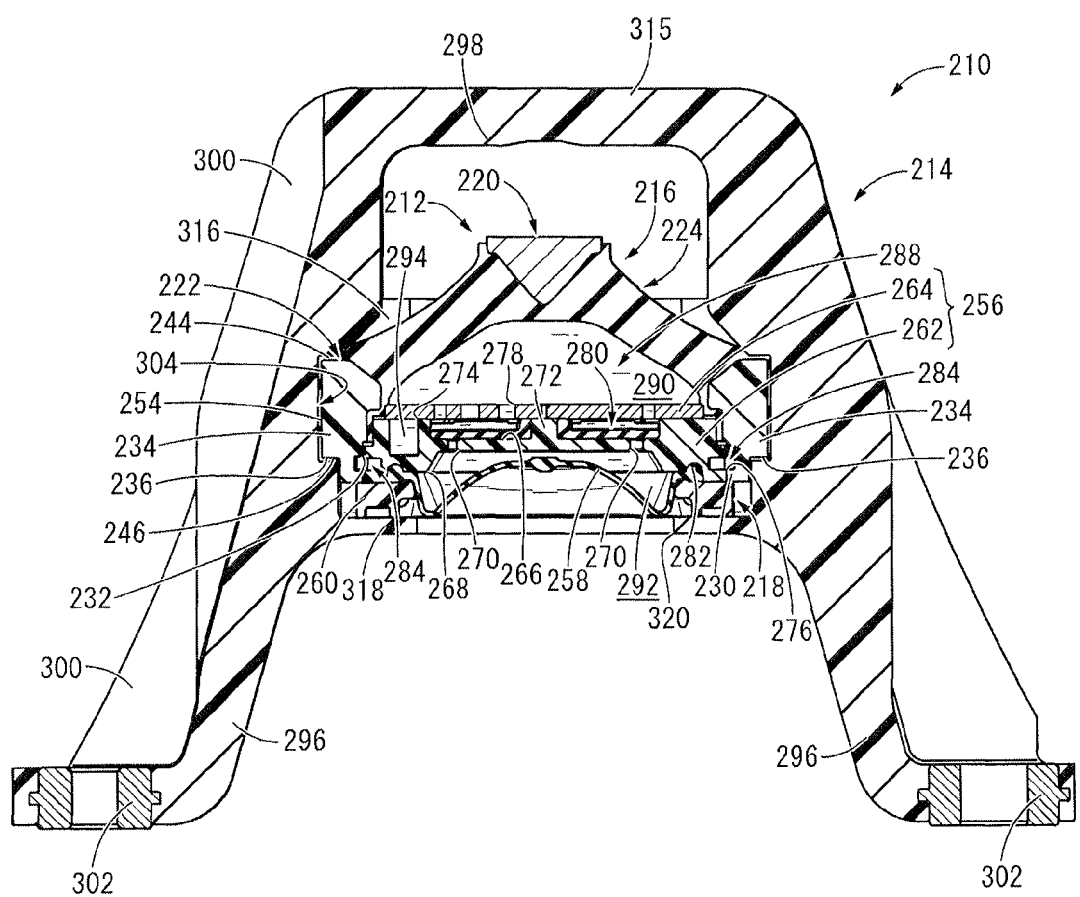
FIG. 12 is a longitudinal cross sectional view of the engine mount shown in FIG. 11.

Next, FIGS. 11 and 12 show an automotive engine mount 210 as a second embodiment of the bracket-equipped vibration-damping device constructed according to the present invention. The engine mount 210 has a structure wherein a mount main body 212 as a vibration-damping device main body is attached to a bracket 214 such that it is inserted in the lateral direction into the bracket 214. In the explanation hereinafter, as a general rule, the up-down direction is the up-down direction in FIG. 11, which is the direction of the mount central axis, the front-back direction is the direction orthogonal to the paper face of FIG. 11, and the left-right direction is the left-right direction in FIG. 11, respectively.

Figure 13:
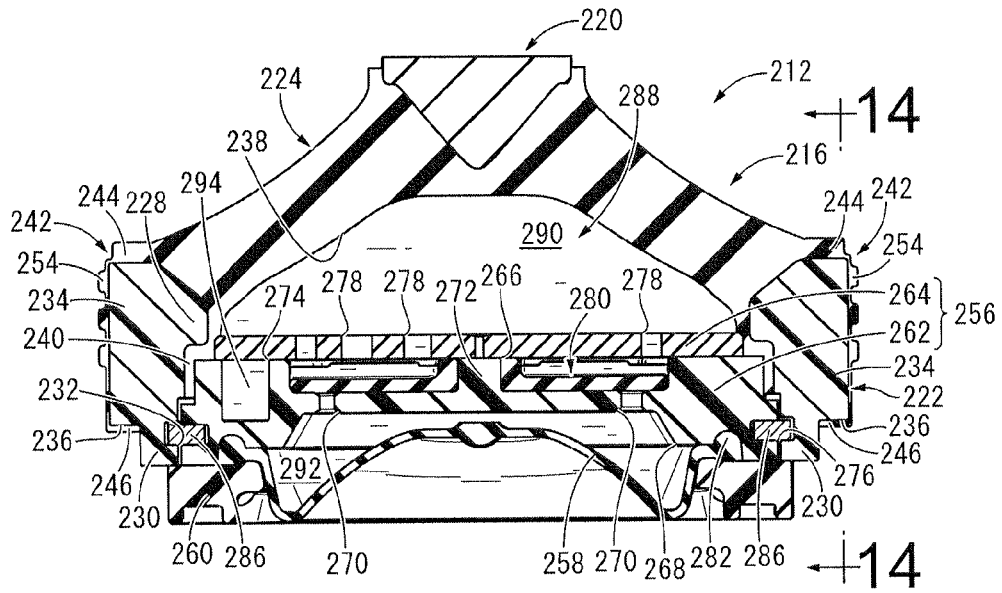
FIG. 13 is an enlarged longitudinal cross sectional view of a mount main body constituting the engine mount shown in FIG. 11, taken along line 13-13 of FIG. 14.
Figure 14:
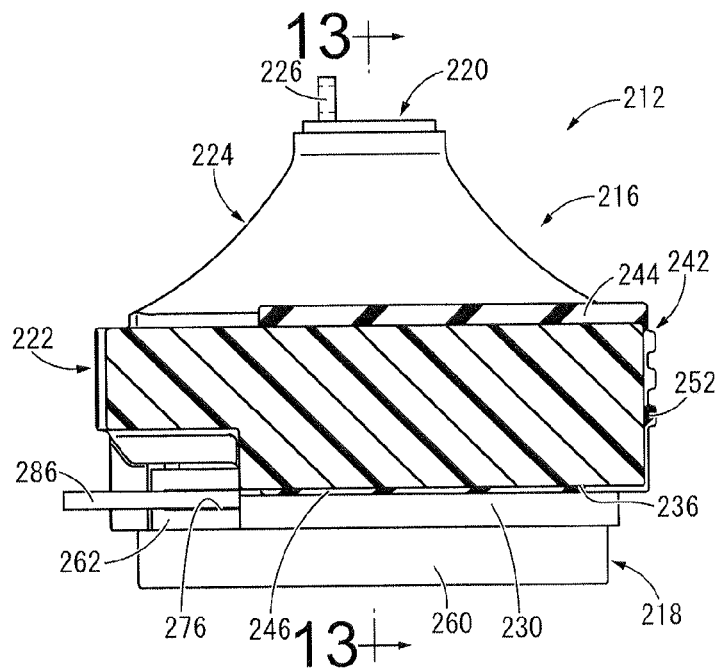
FIG. 14 is a cross sectional view taken along line 14-14 of FIG. 13.

More specifically, the mount main body 212, as shown in FIGS. 13 and 14, comprises an integrally vulcanization molded component 216 and a fluid-filled assembly 218, which are combined. The integrally vulcanization molded component 216 has a structure wherein a first mounting member 220 and a second mounting member 222 are elastically linked by a main rubber elastic body 224.

The first mounting member 220 is a member of high rigidity formed of a metal, a synthetic resin, or the like having a solid shape of a cone or truncated cone inverted in the up-down direction, a circular post, or the like. With the first mounting member 220, an attachment piece 226 is integrally formed so as to project upward and have a bolt hole penetrating therethrough in the front-back direction.

The second mounting member 222 is a member of high rigidity formed of a metal, a synthetic resin, or the like whose whole shape is roughly a rectangular tube. Additionally, with the second mounting member 222, a seal protuberance 228 is integrally formed sticking out to the inner periphery. For the seal protuberance 228, the upper face has a tapered shape and the lower face expands roughly in the axis-perpendicular direction.

Figure 15:
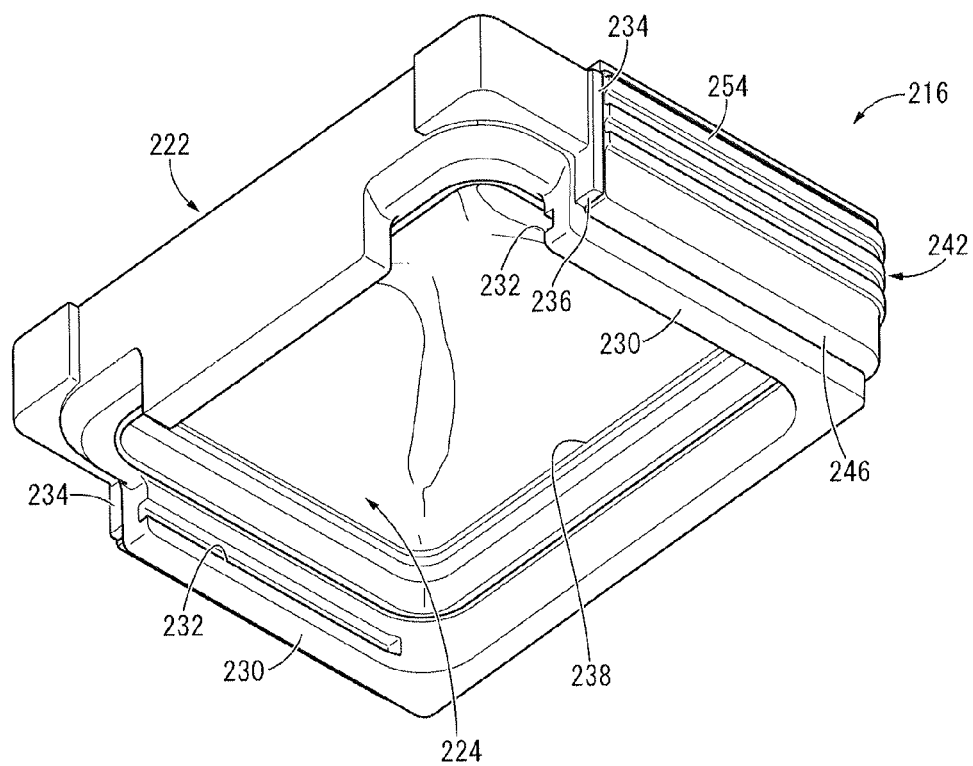
FIG. 15 is a perspective view of an integrally vulcanization molded component of the mount main body shown in FIG. 13.

At each of the left and right sides of the second mounting member 222, an engaging part 230 is formed projecting downward. As FIG. 15 shows, this engaging part 230 is formed at a location biased forward so that the back end of the engaging part 230 (the left end in FIG. 14) is located on the front side (the right side in FIG. 14) of the back end of the second mounting member 222. On each of the engaging parts 230, 230 of the second mounting member 222, an outer groove 232 is formed opening inward in their facing direction and extending in the front-back direction. The engaging parts 230, 230 of this embodiment are reinforced by mutual connection of their front ends.

Besides, at each of the left and right sides of the second mounting member 222, a connection-insert section 234 is provided protruding outward in the left-right direction. This connection-insert section 234 has a shape of a solid substantially-rectangular block extending in the front-back direction. The lower surface of the connection-insert section 234 is a flat support surface 236 expanding in the axis-perpendicular direction.

As FIGS. 12 and 13 show, the first mounting member 220 and the second mounting member 222 are disposed substantially co-axially and separately in the up-down direction, having the main rubber elastic body 224 formed in between. The main rubber elastic body 224 is a rubber elastic body whose substantial shape is a truncated quadrangular pyramid, wherein, to the small diameter side end, the first mounting member 220 is vulcanization bonded with the lower part of the first mounting member 220 buried therein, while to the large diameter side end, the upper part of the second mounting member 222 is vulcanization bonded as overlapped therewith.

In the main rubber elastic body 224, a large diameter recess 238 is formed to be concave in a rectangular shape and open to the lower face. This large diameter recess 238 is a tapered concavity expanding as it goes to the opening side, or downward, for which the upper base wall in the diametrical center part has a plane shape expanding substantially in the axis-perpendicular direction. Note that both the lower end face of the first mounting member 220 and the inner peripheral face of the upper part of the second mounting member 222 are covered with the main rubber elastic body 224 so that neither of these first mounting member 220 and second mounting member 222 is exposed to the inner face of the large diameter recess 238.

The lower part of the second mounting member 222 located further downward than the opening of the large diameter recess 238 is covered with a seal rubber layer 240, which is formed integrally with the main rubber elastic body 224. The seal rubber layer 240 is fixed also to the lower face of the seal protuberance 228 of the second mounting member 222. Note that the seal rubber layer 240 fails to reach the engaging parts 230 of the second mounting member 222 so that the engaging parts 230 are exposed from the main rubber elastic body 224.

To the connection-insert section 234 of the second mounting member 222, a positioning rubber 242 is fixed. The positioning rubber 242 is formed integrally with the main rubber elastic body 224 while integrally including a first up-down urging rubber 244, a second up-down urging rubber 246, a front-back urging rubber 252, and a left-right urging rubber 254. Thus, in the present embodiment, the up-down urging rubber may be constituted including the first up-down urging rubber 244 and the second up-down urging rubber 246.

The first up-down urging rubbers 244 are fixed on the upper surfaces of the connection-insert sections 234. In this embodiment, the first up-down urging rubber 244 is a rubber layer that expands with a substantially constant thickness across its entirety, while having a flat upper face that expands roughly in the axis-perpendicular direction. The second up-down urging rubbers 246 are fixed on the lower surfaces of the connection-insert sections 234. The second up-down urging rubber 246 is a rubber layer that expands with a substantially constant thickness as well as the first up-down urging rubber 244, while having a flat lower face that expands roughly in the axis-perpendicular direction. Note that the first up-down urging rubber 244 and the second up-down urging rubber 246 of the present embodiment cover the substantially whole upper and lower surfaces of the connection-insert section 234.

The first up-down urging rubber 244 is thicker in the up-down direction than the second up-down urging rubber 246. The up-down thickness dimension of the first up-down urging rubber 244 is desirably around 110-400% relative to that of the second up-down urging rubber 246.

In the front-back urging rubber 252 and the left-right urging rubber 254, which are rubber layers as well as the first and second up-down urging rubbers 244, 246, three convex ridges arranged in the up-down direction as parallel are integrally formed protruding outward in the thickness direction. Additionally, the front-back urging rubber 252, which is fixed on the front surface of the connection-insert section 234, and the left-right urging rubber 254, which is fixed on the left-right outer surface of the connection-insert section 234, are provided to be continuous along the outer surface of the connection-insert section 234. The upper and lower ends of these front-back urging rubber 252 and left-right urging rubber 254 are integrally connected to the first up-down urging rubber 244 and the second up-down urging rubber 246.

Meanwhile, the fluid-filled assembly 218 has a structure wherein a partition member 256, a flexible film 258, and a pressing member 260 are integrally connected, as FIG. 13 shows.

The partition member 256 comprises a partition member main body 262 and a lid plate member 264 which are superposed and fixed to each other in the up-down direction. The partition member main body 262 is a rigid member formed of a synthetic resin or a metal in a substantially rectangular plate shape. The inner peripheral part of the partition member main body 262, with a housing concavity 266 formed opening to its upper face and a lightening concavity 268 formed opening to its lower face, is thinner in the up-down direction than the outer peripheral part thereof. Additionally, in the bottom wall of the housing concavity 266 of the partition member main body 262, a plurality of lower through holes 270 are formed penetrating therethrough in the up-down direction. At the center of the housing concavity 266, a central connecting part 272 is provided protruding upward from the bottom face with a substantially circular post shape.

In the thick outer peripheral part of the partition member main body 262, a peripheral groove 274 is formed opening to the upper face and extending in the peripheral direction. This peripheral groove 274 extends on the outer peripheral side of the housing concavity 266 by a prescribed length that is shorter than one periphery.

Furthermore, in the outer peripheral part of the partition member main body 262, inner grooves 276 are formed. The inner grooves 276, which open to the left-right outer faces of the partition member main body 262, are formed to be continuous along the whole front-back length of the partition member main body 262.

For the lid plate member 264 having a substantial shape of a thin rectangular plate, the portion that covers the housing concavity 266 when being fixed to the partition member main body 262 as described later has a plurality of upper through holes 278 formed therethrough in the up-down direction. The lid plate member 264 is superposed to the upper face of the partition member main body 262, and then these partition member main body 262 and lid plate member 264 are fixed to one another by means of using a not-shown screw, welding, or the like.

By overlapping the partition member main body 262 and the lid plate member 264, the opening of the housing concavity 266 of the partition member main body 262 is covered by the lid plate member 264. This disposes a movable film 280, which is to be housed in the housing concavity 266 of the partition member main body 262, between the partition member main body 262 and the lid plate member 264 in the up-down direction. This movable film 280, which has a substantially annular plate shape whose inner peripheral rim protrudes upward, is disposed externally about the central connecting part 272 of the partition member main body 262. With the inner peripheral rim clamped in the up-down direction between the partition member main body 262 and the lid plate member 264, the movable film 280 is supported by the partition member 256.

The flexible film 258, which is a thin rubber film having a substantially-rectangular dome shape with a slack in the up-down direction, can deform easily in the thickness direction. Besides, on the outer peripheral rim of the flexible film 258, a thick clamped part 282 is integrally formed as continuous along the entire periphery.

The pressing member 260 has a substantial shape of a rectangular frame, wherein the inner peripheral part is thinned out in the up-down direction compared to the outer peripheral part and provided to be biased upward.

The partition member 256, the flexible film 258, and the pressing member 260 of this structure are superposed and joined to one another in the up-down direction to constitute the fluid-filled assembly 218. Specifically, for example, a junction protrusion provided for either one of the partition member main body 262 and the pressing member 260 is inserted through a junction hole formed in the other of the partition member main body 262 and the pressing member 260. After that, the protruding tip of the junction protrusion is expanded in diameter by laser heating or the like, thereby joining and fixing the partition member 256 and the pressing member 260 to each other. However, the fixing method for the partition member main body 262 and the pressing member 260 is not limited by the example shown above and can be realized also by screwing or welding, for example. By the clamped part 282 of the flexible film 258 being clamped in the up-down direction between the outer peripheral part of the partition member main body 262 and the inner peripheral part of the pressing member 260, the outer peripheral rim of the flexible film 258 is clamped by the partition member 256 and the pressing member 260. Consequently, those partition member 256, flexible film 258, and pressing member 260 are joined to each other. The outer peripheral rim of the flexible film 258 is clamped continuously along the entire periphery between the partition member main body 262 and the pressing member 260, whereby the gap between the overlapped faces of the partition member main body 262 and the pressing member 260 is sealed in a ring shape.

As FIG. 13 shows, the fluid-filled assembly 218 is mounted to the integrally vulcanization molded component 216 such that the partition member 256 is inserted in the second mounting member 222. As a result, the partition member 256 is overlapped with the second mounting member 222 as viewed in the axis-perpendicular direction. In this embodiment, the outer peripheral face of the partition member 256 is superposed to the inner peripheral face of the second mounting member 222.

Between the inner peripheral face of the second mounting member 222 and the outer peripheral face of the partition member 256 that are superposed, pin insertion holes 284 that extend in the front-back direction are formed by the outer grooves 232 of the second mounting member 222 and the inner grooves 276 of the partition member main body 262. Inserting positioning pins 286 into the pin insertion holes 284 positions the second mounting member 222 and the partition member 256 relative to each other in the axial direction.

The pin insertion holes 284 of this embodiment have a substantially rectangular cross section, and a pair of them, which are mutually separate, are provided on both left and right sides. Each of these pin insertion holes 284, 284 on the both left and right sides extends like a straight line in the front-back direction. In the present embodiment, the up-down width dimension of the opening inside in the left-right direction of the outer groove 232 is larger than the up-down width dimension of the opening outside in the left-right direction of the inner groove 276. Also for this embodiment, the depth dimension of the outer groove 232 formed in the second mounting member 222 made of a metal is smaller than the depth dimension of the inner groove 276 formed in the partition member main body 262 made of a synthetic resin. Moreover, the front-back length of the outer groove 232 is shorter than the front-back length of the inner groove 276, and the back end of the outer groove 232 is positioned further forward than the back end of the inner groove 276.

As FIGS. 13 and 14 show, inserting the positioning pins 286, 286 into the pin insertion holes 284, 284 locks the second mounting member 222 and the partition member 256 with respect to the positioning pins 286, 286 in the axial direction, thereby positioning the second mounting member 222 and the partition member 256 relatively in the axial direction using the positioning pins 286. Specifically, the outside portions in the left-right direction of the positioning pins 286, 286 are inserted into the outer grooves 232 of the second mounting member 222, while the inside portions in the left-right direction of the positioning pins 286, 286 are inserted into the inner grooves 276 of the partition member 256. Since the back ends of the outer grooves 232 are positioned further forward than the back ends of the inner grooves 276, the positioning pins 286, 286 are inserted into the inner grooves 276 and then into the outer grooves 232.

The positioning pins 286, 286 are thus inserted into the pin insertion holes 284, 284, so that the second mounting member 222 and the partition member 256 are positioned at an appropriate axial position relative to one another. Consequently, the seal rubber layer 240, which is fixed on the second mounting member 222, is clasped between the second mounting member 222 and the partition member 256, thereby keeping fluid-tight sealing of the gap between those second mounting member 222 and partition member 256. Especially since the second mounting member 222 and the partition member 256 are relatively positioned in the axial direction, the seal rubber layer 240 is compressed in the up-down direction between the seal protuberance 228 of the second mounting member 222 and the upper face of the partition member 256, thereby sealing the gap between the second mounting member 222 and the partition member 256. In sum, by axial locking in the positioning pins 286, 286 inserted in the pin insertion holes 284, 284, the second mounting member 222 and the partition member 256 are relatively positioned at a sealing position where the gap in between is sealed fluid-tightly.

By mounting the fluid-filled assembly 218 to the integrally vulcanization molded component 216, a fluid chamber 288 that is fluid-tightly separated from the outside is formed between the main rubber elastic body 224 and the flexible film 258 in the axial direction. For this fluid chamber 288, a portion of its wall is constituted by the main rubber elastic body 224, while another portion of its wall is constituted by the flexible film 258, and a non-compressible fluid or liquid is sealed therein. Note that the non-compressible fluid to be filled in the fluid chamber 288, i.e., the sealed fluid, is not particularly limited, although preferably adopted are water, ethylene glycol, propylene glycol, alkylene glycol, polyalkylene glycol, silicone oil, and a mixture liquid thereof, for example. In addition, the sealed fluid is desirably a low-viscosity fluid so as to advantageously obtain vibration-damping effect based on the flowing action of the fluid, which will be described later. That is, more preferably adopted is a low-viscosity fluid having viscosity of 0.1 Pa·s or lower.

The partition member 256 is disposed to expand substantially in the axis-perpendicular direction in the fluid chamber 288, so that the fluid chamber 288 is divided in two in the up-down direction by the partition member 256. Consequently, formed on the upper side of the partition member 256 is a pressure-receiving chamber 290 whose wall is partially constituted by the main rubber elastic body 224 for which a vibration input in the up-down direction causes internal pressure fluctuation. On the other hand, formed on the lower side of the partition member 256 is an equilibrium chamber 292 whose wall is partially constituted by the flexible film 258, which allows capacity change and keeps substantially constant internal pressure. The filling of the non-compressible fluid into the pressure-receiving chamber 290 and the equilibrium chamber 292 is realized for example by performing the connection work for the integrally vulcanization molded component 216 and the fluid-filled assembly 218 using the positioning pins 286, 286 in a cistern filled with the non-compressible fluid. However, it is also possible to inject the non-compressible fluid into the pressure-receiving chamber 290 and the equilibrium chamber 292 with a syringe etc. after connecting the integrally vulcanization molded component 216 and the fluid-filled assembly 218 by the positioning pins 286, 286 in a fluid-tight manner.

In the partition member 256, an orifice passage 294 is formed to communicate the pressure-receiving chamber 290 and the equilibrium chamber 292 with one another. The upper opening of the peripheral groove 274 that is formed in the partition member main body 262 is covered by the lid plate member 264 to form a tunnel-shaped passage. This passage is communicated with the pressure-receiving chamber 290 through a not-shown upper communication hole formed in the lid plate member 264 at one end, and with the equilibrium chamber 292 through a not-shown lower communication hole formed in the partition member main body 262 at the other end, thereby forming the orifice passage 294. The tuning frequency of this orifice passage 294, which is the resonance frequency of the flowing fluid, is set to a frequency corresponding to the low-frequency vibration such as engine shake, by adjusting the ratio (A/L) of the passage cross sectional area A to the passage length L considering the wall spring rigidity of the fluid chamber 288. An input of axial vibration of the low frequency to which the orifice passage 294 is tuned causes relative pressure fluctuation between the pressure-receiving chamber 290 and the equilibrium chamber 292, so that the sealed fluid flows between the pressure-receiving chamber 290 and the equilibrium chamber 292 via the orifice passage 294 in a resonant state. This exerts the vibration-damping effect based on the flow action such as the resonance action of the fluid, namely high attenuating or damping action.

On the upper face of the movable film 280 of the partition member 256, the liquid pressure of the pressure-receiving chamber 290 is exerted via the upper through holes 278, while on the lower face thereof, the liquid pressure of the equilibrium chamber 292 is exerted via the lower through holes 270. Consequently, when a large load input lowers the liquid pressure in the pressure-receiving chamber 290 markedly in relation to the liquid pressure in the equilibrium chamber 292, the movable film 280 undergoes elastic deformation and is spaced from the bottom face of the housing concavity 266. This opens the lower through holes 270, which have been covered by the movable film 280, thereby communicating the pressure-receiving chamber 290 and the equilibrium chamber 292 with one another via the upper through holes 278, the housing concavity 266, and the lower through holes 270. As a result, negative pressure of the pressure-receiving chamber 290 is decreased or eliminated as rapidly as possible, thereby avoiding cavitation bubbles and hence noise resulting from cavitation. Note that it is also possible to adopt such a structure that upon input of a vibration with a higher frequency than the tuning frequency of the orifice passage 294, vibration-damping effect (vibration isolation action) is exerted based on liquid pressure transmission between the pressure-receiving chamber 290 and the equilibrium chamber 292 owing to the elastic deformation of the movable film.

Figure 16:
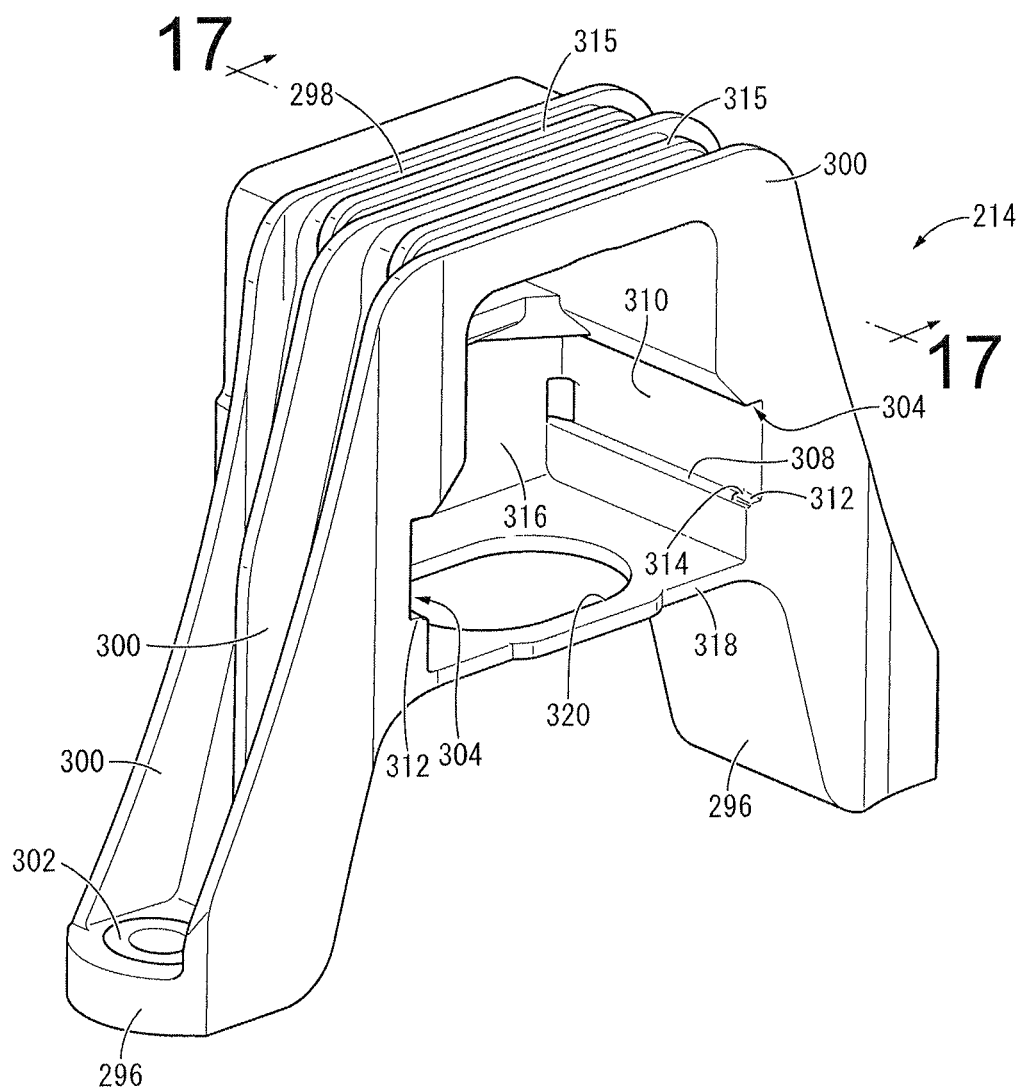
FIG. 16 is a perspective view of a bracket of the engine mount shown in FIG. 11.

To the mount main body 212 of this structure, the bracket 214 is attached. The bracket 214 is a member of high rigidity formed of a material including a metal like an aluminum alloy and a fiber-reinforced synthetic resin. As FIGS. 12 and 16 show, the bracket 214 integrally includes left and right mounting legs 296, 296 extending in the up-down direction and a top plate 298 integrally connecting the upper edges of the left and right mounting legs 296, 296.

The left and right mounting legs 296, 296, which have a thick plate shape with a prescribed width dimension in the front-back direction, are disposed to face each other in the left-right direction. Additionally, for the mounting legs 296, a reinforcing rib 300 is integrally formed with each of both front-back edges and front-back intermediate portion thereof so as to protrude outward in the left-right direction. The lower edges of the left and right mounting legs 296, 296 have a shape of a plate expanding outward in the left-right direction, and a mounting nut 302 is fixed on each of them.

Each of the left and right mounting legs 296, 296 of the bracket 214 has a connection groove 304 extending in the front-back direction while opening inward in the facing direction. This connection groove 304 has a groove shape roughly corresponding to the connection-insert section 234 of the second mounting member 222. More specifically, in the connection groove 304, an upper inner surface 306 and a lower inner surface 308 as groove side wall inner surfaces, each of which is a plane expanding in the axis-perpendicular direction, face one another as spaced apart therefrom with a prescribed distance in the up-down direction. Meanwhile, a left-right inner surface 310 as a groove base inner surface is a plane expanding in the up-down direction and in the front-back direction, which is continuous to the upper inner surface 306 and the lower inner surface 308.

The groove width dimension of the connection groove 304 (the up-down distance between the upper inner surface 306 and the lower inner surface 308) is smaller than the sum value of the up-down thickness dimension of the connection-insert section 234 and the first and second up-down urging rubbers 244, 246 in a single mount main body 212 before the attachment of the bracket 214.

Figure 17:
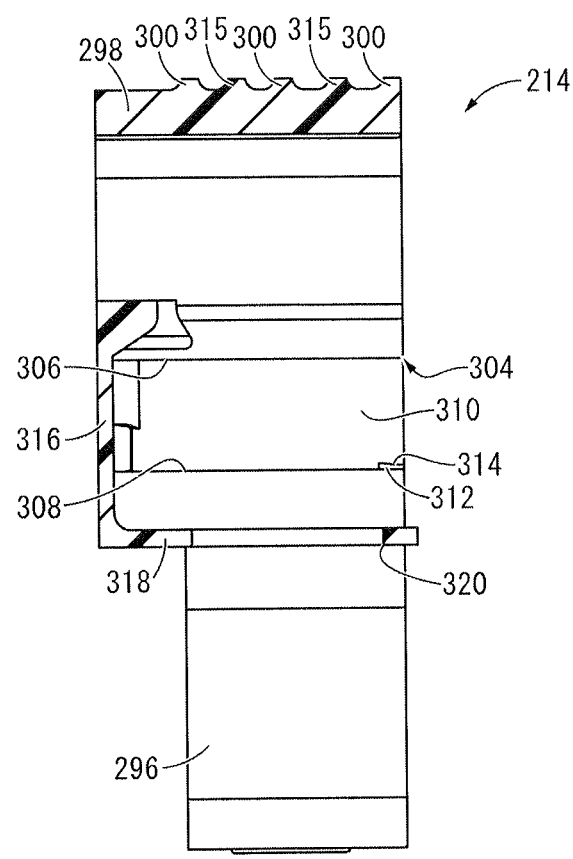
FIG. 17 is a cross sectional view taken along line 17-17 of FIG. 16.

On each of the left and right mounting legs 296, 296, a lock protrusion 312 is formed. As FIGS. 16 and 17 show, the lock protrusion 312 protrudes upward from the lower inner surface 308 in the back end of the connection groove 304. The lock protrusion 312 of this embodiment is formed in the outside portion in the left-right direction of the connection groove 304. The lock protrusion 312 is formed partially in the groove depth direction of the connection groove 304, although it may be formed along the entirety in the groove depth direction of the connection groove 304. Moreover, the protrusion dimension of the lock protrusion 312 is gradually smaller as it goes backward and the protruding tip face (the upper face) thereof is an incline 314 that slants downward as it goes backward. The incline 314 of this embodiment is a single flat face with a substantially constant inclination angle in the front-back direction. However, the incline 314 can be a curved face with an inclination angle varying continuously in the front-back direction, or a folded face with an inclination angle varying stepwise in the front-back direction.

The protrusion height of the front end of the lock protrusion 312 (the maximum protrusion height) is smaller than the sum of the thickness dimension of the first up-down urging rubber 244 that covers the upper surface of the connection-insert section 234 and the thickness dimension of the second up-down urging rubber 246 that covers the lower surface of the connection-insert section 234. Besides, the distance in the front-back direction between the opposite faces of the lock protrusion 312 and a front wall 316, which will be described later, is longer than the front-back length of the connection-insert section 234 and shorter than the distance between the back end of the connection-insert section 234 and the front end of the front-back urging rubber 252.

With the upper edges of the left and right mounting legs 296, 296, the top plate 298 is integrally formed. The shape of the top plate 298 is a plate extending in the left-right direction with a prescribed width in the front-back direction. The reinforcing rib 300 is formed protruding upward on each of both front-back edges and front-back intermediate portion of the top plate 298. Between these reinforcing ribs 300, 300, 300 in the front-back direction, reinforcing ribs 315 are integrally formed respectively.

With the front edges of the left and right mounting legs 296, 296, the front wall 316 is integrally formed. The front wall 316 whose shape is a plate extending in the left-right direction is disposed to be separated downward from the top plate 298, while the up-down intermediate parts of the left and right mounting legs 296, 296 are integrally linked by the front wall 316. This front wall 316 obstructs the front ends of the connection grooves 304 formed in the left and right mounting legs 296, 296, although passage holes, which pass in the front-back direction through the linkage parts of the left and right outer ends of the front wall 316 and the left and right mounting legs 296, 296, are communicated with the connection grooves 304. The passage holes are formed penetrating in the front-back direction through the both left and right ends of the front wall 316, so that the front ends of the connection grooves 304 are obstructed while being communicated with the front side at the passage holes.

Between the opposite faces of the left and right mounting legs 296, 296, a bottom plate 318 is integrally formed therewith. The bottom plate 318, in a plate shape extending in the left-right direction with a prescribed width in the front-back direction, is disposed to face the top plate 298 in the up-down direction. The bottom plate 318 integrally links the up-down intermediate parts of the left and right mounting legs 296, 296 and the lower end of the front wall 316 to each other. Moreover, in the bottom plate 318, a window 320 is formed therethrough in the up-down direction for permitting the deformation of the flexible film 258. Note that the bottom plate 318 is provided on the lower side of the connection grooves 304.

The bracket 214 is mounted on the mount main body 212. Specifically, into the area surrounded by the left and right mounting legs 296, 296, the top plate 298, and the bottom plate 318 in the bracket 214, the mount main body 212 is inserted from the back side in the lateral direction. The connection-insert sections 234, 234 of the second mounting member 222 of the mount main body 212 are inserted into the connection grooves 304, 304 of the bracket 214, so that the bracket 214 is mounted on the mount main body 212.

Figure 18:
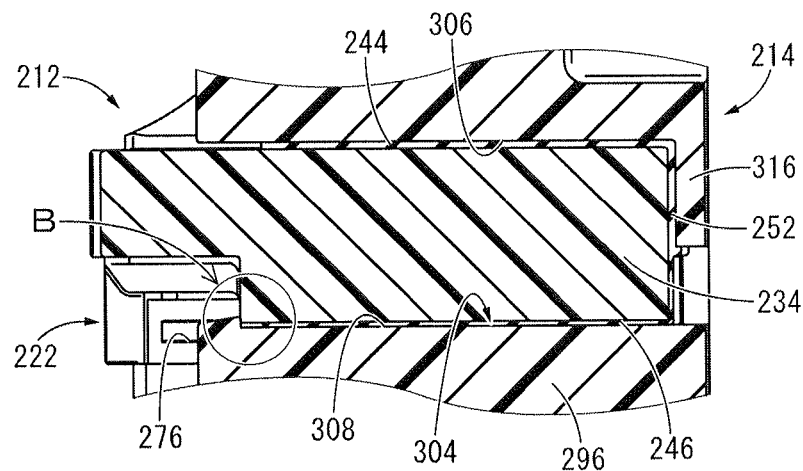
FIG. 18 is a cross sectional view taken along line 18-18 of FIG. 11.

More specifically, when the connection-insert section 234 is inserted in the connection groove 304, as FIG. 18 shows, the substantially whole connection-insert section 234, on which the first up-down urging rubber 244 and the second up-down urging rubber 246 are fixed, is clamped in the up-down direction between the upper inner surface 306 and the lower inner surface 308 of the connection groove 304. Owing to this, the connection-insert sections 234 and the connection grooves 304 are mutually locked in the up-down direction, while the second mounting member 222 including the connection-insert sections 234 is positioned in the up-down direction relative to the bracket 214 including the connection grooves 304.

The sum of the up-down thickness dimension of the connection-insert section 234 and those of the first and second up-down urging rubbers 244, 246 is greater than the up-down groove width dimension of the connection groove 304. Accordingly, when the mount main body 212 is equipped with the bracket 214, the first up-down urging rubber 244 is compressed in the up-down direction between the upper surface of the connection-insert section 234 and the upper inner surface 306 of the connection groove 304, which face one another. On the other hand, the second up-down urging rubber 246 is compressed in the up-down direction between the lower surface of the connection-insert section 234 and the lower inner surface 308 of the connection groove 304, which face one another. Consequently, the second mounting member 222 including the connection-insert sections 234 is elastically positioned in the up-down direction in relation to the bracket 214 including the connection grooves 304 by the first up-down urging rubbers 244 and the second up-down urging rubbers 246.

The sum of the up-down thickness dimension of the first up-down urging rubber 244 that is fixed on the upper surface of the connection-insert section 234 and that of the second up-down urging rubber 246 that is fixed on the lower surface of the connection-insert section 234 is greater than the up-down protrusion height of the lock protrusion 312. As a result, the up-down compression deformation of the first up-down urging rubber 244 and the second up-down urging rubber 246 allows the connection-insert section 234 to be inserted into the connection groove 304 beyond the lock protrusion 312.

Thus, the connection-insert section 234 slides beyond the lock protrusion 312 owing to the elastic deformation of the first up-down urging rubber 244 and the second up-down urging rubber 246. This structure eliminates the need of the deformation for the connection-insert section 234 and the connection groove 304 in the insertion of the connection-insert section 234 into the connection groove 304. Consequently, the durability is improved for the second mounting member 222 including the connection-insert sections 234 and the bracket 214 including the connection grooves 304. Especially for the engine mount 210 whose second mounting member 222 and bracket 214 are formed of a synthetic resin, the second mounting member 222 and the bracket 214 are avoided from being damaged in the assembly.

In addition, the lower surface of the connection-insert section 234 is covered by the second up-down urging rubber 246. This rubber avoids direct contact between the lower surface of the connection-insert section 234 and the protruding tip of the lock protrusion 312 when the connection-insert section 234 is sliding over the lock protrusion 312. As a result, damages are prevented for the connection-insert section 234 and the lock protrusion 312. Moreover, the second up-down urging rubber 246 undergoes large elastic deformation locally on the contact location in relation to the lock protrusion 312. By so doing, the connection-insert section 234 is inserted into the connection groove 304 while sliding beyond the lock protrusion 312 with less resistance, thereby facilitating the assembly work of the mount main body 212 and the bracket 214.

Furthermore, in the present embodiment, the protrusion height of the lock protrusion 312 is gradually smaller as it goes backward, so that the connection-insert section 234 slides beyond the lock protrusion 312 more easily.

Figure 19:
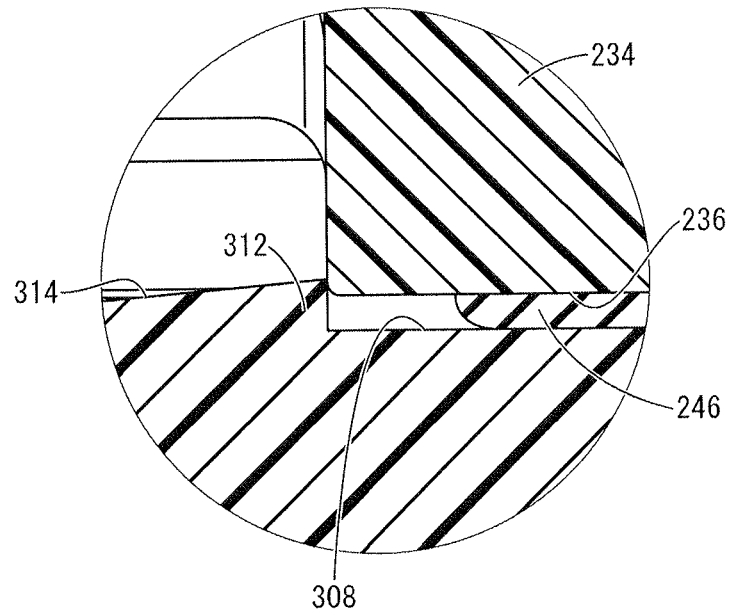
FIG. 19 is a fragmental enlarged view of a principal part, i.e., Part B of FIG. 18.
Figure 20:
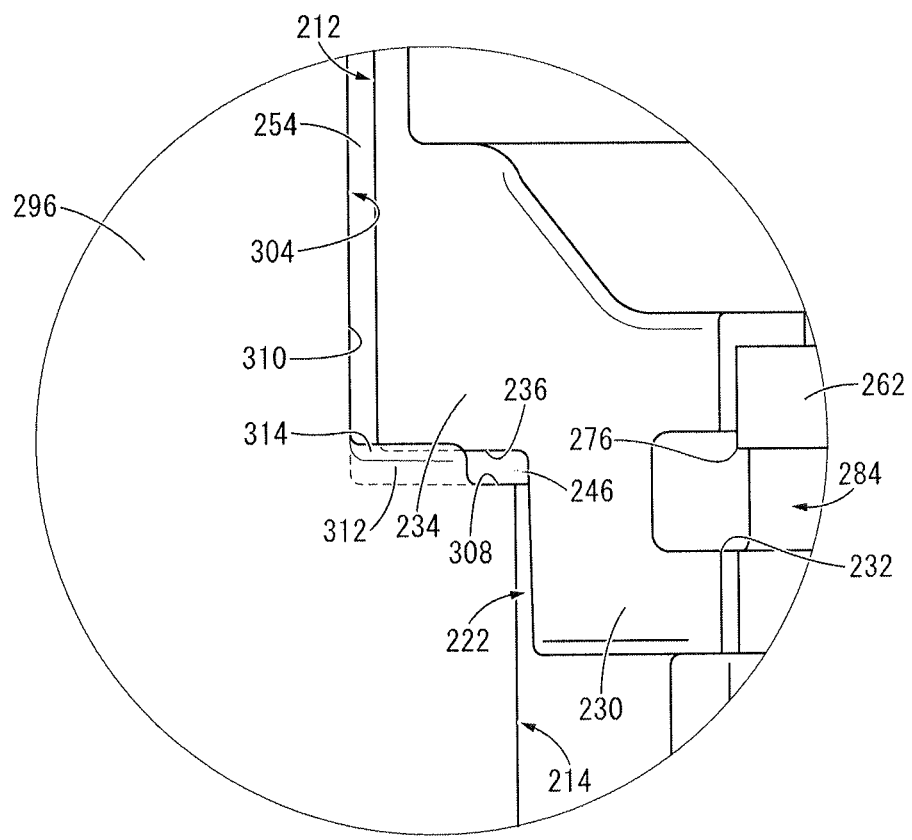
FIG. 20 is a fragmental enlarged view of a principal part, i.e., Part C of FIG. 11.

Also, as FIG. 19 shows, extraction of the connection-insert section 234 from the connection groove 304 to the back side is avoided by the locking of the connection-insert section 234 in the lock protrusion 312 of the connection groove 304 in the front-back direction. This prevents separation of the mount main body 212 and the bracket 214. Specifically, when sliding beyond the lock protrusion 312, the connection-insert section 234 is displaced upward by the elastic deformation of the first up-down urging rubber 244. After being inserted into the connection groove 304 beyond the lock protrusion 312, the connection-insert section 234 is urged and displaced downward by elastic recovery deformation of the first up-down urging rubber 244. Consequently, the connection-insert section 234 inserted further forward than the lock protrusion 312 in the connection groove 304 overlaps the lock protrusion 312 with a prescribed width in the up-down direction as viewed in the front-back direction (see FIGS. 19 and 20). The connection-insert section 234 inserted in the connection groove 304 is locked in the lock protrusion 312 of the connection groove 304 in the front-back direction, thereby preventing the extraction of the connection-insert section 234 from the connection groove 304.

Besides, the first up-down urging rubber 244 and the second up-down urging rubber 246 are integrally formed such that the first up-down urging rubber 244 is thicker than the second up-down urging rubber 246. Therefore, when the connection-insert section 234 is sliding over the lock protrusion 312, the up-down compression deformation amount of the first up-down urging rubber 244 is larger than that of the second up-down urging rubber 246. Additionally, when the connection-insert section 234 is inserted in the connection groove 304 at the front side beyond the lock protrusion 312, elastic recovery deformation amount of the first up-down urging rubber 244 is larger than that of the second up-down urging rubber 246. Accordingly, the connection-insert section 234 is displaced further downward than during sliding over the lock protrusion 312, by the difference between the deformation amount of the first up-down urging rubber 244 and the deformation amount of the second up-down urging rubber 246. Thus, the lower part of the connection-insert section 234 is inserted into the space between the front wall 316 and the lock protrusion 312 in the front-back direction in the connection groove 304, so that it is positioned between them in the front-back direction.

The front-back urging rubber 252 that is fixed on the front surface of the connection-insert section 234 is compressed in the front-back direction between the connection-insert section 234 and the front wall 316, thereby elastically urging the connection-insert section 234 backward in relation to the bracket 214. Consequently, the connection-insert section 234 is abutted on the lock protrusion 312 in the front-back direction. This relatively positions the mount main body 212 including the connection-insert sections 234 and the bracket 214 including the connection grooves 304 in the front-back direction, while avoiding noise that might be caused by the contact of the connection-insert section 234 and the lock protrusion 312 separated in the front-back direction.

Since the up-down dimension of the front face of the lock protrusion 312 is large, the connection-insert section 234 positioned in the front side beyond the lock protrusion 312 is locked in the lock protrusion 312 in the front-back direction with a large area. By so doing, the connection-insert section 234 and the connection groove 304 are effectively positioned in the front-back direction. In addition, both the back surface of the connection-insert section 234 and the front face of the lock protrusion 312 expand as substantially orthogonal to the front-back direction, whereby the connection-insert section 234 is effectively avoided from being dislodged backward from the connection groove 304, by front-back locking of the connection-insert section 234 and the lock protrusion 312.

Additionally, in the present embodiment, the left-right urging rubber 254 is fixed on the left-right outer surface of the connection-insert section 234, so that the left-right urging rubber 254 is compressed between the connection-insert section 234 and the left-right inner surface 310 of the connection groove 304. Consequently, the left-right urging rubber 254 allows the error between the distance of the left-right outer surfaces of the left and right connection-insert sections 234, 234 in the mount main body 212 and the distance of the groove base inner surfaces of the left and right connection grooves 304, 304 in the bracket 214, which results from dimensional error of the parts or the like, thereby facilitating the assembly of the mount main body 212 and the bracket 214.

As FIG. 11 shows, the engine mount 210 is mounted on the vehicle by the first mounting member 220 being attached to a power unit 322, as well as the bracket 214, which is fixed to the second mounting member 222 being mounted on a vehicle body 324 with the mounting nuts 302. For the engine mount 210 as mounted on the vehicle, the distributed load of the power unit 322 acts downward on the mount main body 212. In the present embodiment, the second up-down urging rubber 246, which is fixed on the lower surface of the connection-insert section 234 of the mount main body 212, is thinner than the first up-down urging rubber 244. This reduces the elastic deformation amount of the positioning rubber 242 by the action of the distributed load of the power unit 322, thereby improving the durability of the positioning rubber 242.

In the present embodiment, as FIG. 12 shows, when the mount main body 212 is mounted on the bracket 214, the second mounting member 222 and the fluid-filled assembly 218 are clamped in the up-down direction between the upper inner surface 306 of the connection groove 304 and the upper face of the bottom plate 318 of the bracket 214. Thus, the second mounting member 222 and the fluid-filled assembly 218 are positioned and retained relative to each other in the up-down direction. Therefore, it is also possible to extract the positioning pins 286, which are inserted between the second mounting member 222 and the partition member 256, from the pin insertion holes 284, while keeping the fluid-tight sealing between the second mounting member 222 and the fluid-filled assembly 218. This enables repeated use of the positioning pins 286.

Although the embodiments of this invention have been described above, this invention is not limited by the specific descriptions of the embodiments. In the first embodiment described above, for example, it is not necessary to form the notch in the connection-insert section, and the whole lower surface of the connection-insert section may be a flat support surface. Moreover, if the notch is omitted, provision of the detent projection formed on the back side of the notch is not particularly required, either, as long as the back end of the connection-insert section is configured to be locked in the lock protrusion.

In the aforesaid first and second embodiments, the lock protrusion may be formed along the entire connection groove in the groove depth direction. In addition, the lock protrusion is desirably provided at the back end in the insertion direction of the connection groove, though it can be provided at the middle portion thereof in the insertion direction.

For the first embodiment described above, the up-down urging rubber fixed on the connection-insert section is desirably fixed on the upper surface thereof, though it may be fixed on the lower surface thereof, as accompanied by the lock protrusion formed protruding on the upper inner surface of the connection groove. Besides, it is desired that the surface of the connection-insert section that is opposite the surface where the up-down urging rubber is fixed is exposed to directly abut the connection groove as shown in the aforesaid embodiment, though it may be covered with a rubber layer, for example. Note that the up-down urging rubber can be also formed separately from the main rubber elastic body, and it may be also formed separately from the front-back urging rubber and the left-right urging rubber. Furthermore, each of the front-back urging rubber and the left-right urging rubber is omissible and separately formable from the up-down urging rubber.

In the above-mentioned first and second embodiments, the fluid-filled mount main bodies 12, 212 are shown as examples of the vibration-damping device main body. However, it is also possible to use a solid type vibration-damping device main body wherein the first mounting member and the second mounting member are elastically linked by the main rubber elastic body, an active fluid-filled vibration-damping device main body that obtains active vibration-damping effect using an actuator, and a switch type fluid-filled vibration-damping device main body for which the vibration-damping characteristics can be switched, for example. Besides, by the mount main body 12, 212 of the above-mentioned first and second embodiments, the structure wherein the integrally vulcanization molded component 16, 216 and the fluid-filled assembly 18, 218 are positioned and retained by the positioning pins 86, 286 is shown as an example. However, the mount main body can be configured such that the integrally vulcanization molded component and the fluid-filled assembly are positioned and retained by press fitting, swaging, or the like, for example.

The specific structure of the bracket as shown in the aforementioned first and second embodiments is just an example. As long as the bracket includes the connection groove, it is possible to change as appropriate the attachment structure to the vehicle body 124, 324 and the specific structure etc. with respect to the top plate 98, 298 and the bottom plate 118, 318, if they are adopted.

In the aforesaid second embodiment, it is not always necessary for the first up-down urging rubber to be thicker than the second up-down urging rubber in the up-down direction. That is, the first up-down urging rubber and the second up-down urging rubber may be formed with substantially the same thickness, or the first up-down urging rubber can be thinner than the second up-down urging rubber. Besides, the first up-down urging rubber and the second up-down urging rubber may be formed separately from the main rubber elastic body, the front-back urging rubber, the left-right urging rubber, or the like, and they can be formed separately from each other. Moreover, it is also possible to omit the front-back urging rubber and the left-right urging rubber.

In the second embodiment mentioned above, it is possible as well to fix the first up-down urging rubber on the lower surface of the connection-insert section while fixing the second up-down urging rubber on the upper surface of the connection-insert section. In this case, the lock protrusion is formed protruding on the upper inner surface of the connection groove.

In the second embodiment described before, it is possible to employ a structure wherein the lock protrusion is formed partially in the groove depth direction in the connection groove, while the notch opening to the lower surface of the connection-insert section is formed to extend in the front-back direction with a cross sectional shape corresponding to the lock protrusion, and the detent projection is formed at the back end of the notch so as to project downward. According to this structure, when the connection-insert section is inserted into the connection groove, the lock protrusion moves within the notch. This reduces insertion resistance due to contact of the lock protrusion and the second up-down urging rubber, thereby facilitating the assembly work of the vibration-damping device main body and the bracket. Note that the second up-down urging rubber is fixed on the portion apart from the notch in the left-right direction, and it may be fixed also on the protruding tip face of the detent projection.

What is claimed is:

1. A bracket-equipped vibration-damping device comprising:
   a vibration-damping device main body including:
      a first mounting member;
      a second mounting member being separated from the first mounting member in an up-down direction; and
      a main rubber elastic body elastically connecting the first and second mounting members to one another;
   a bracket receiving the vibration-damping device main body inserted thereinto in a lateral direction;
   a connection-insert section provided for the second mounting member of the vibration-damping device main body;
   a connection groove provided for the bracket, the connection groove extending in an insertion direction of the vibration-damping device main body into the bracket;
   at least one up-down urging rubber fixed on an outer surface of the connection-insert section on a first side of upper and lower sides; and
   a lock protrusion formed on an inner surface of the connection groove on a second side of the upper and lower sides, with a smaller protrusion dimension than an up-down thickness of the up-down urging rubber such that the connection-insert section is inserted into the connection groove in the lateral direction beyond the lock protrusion before the connection-insert section is urged to the second side by the up-down urging rubber so as to be positioned relative to the connection groove.

2. The bracket-equipped vibration-damping device according to claim 1, wherein the lock protrusion is formed partially in a groove depth direction of the connection groove, while a notch opens on a surface of the connection-insert section on the second side in a position corresponding to the lock protrusion, and for the surface of the connection-insert section on the second side, a portion apart from the notch is a support surface that abuts the inner surface of the connection groove, and a detent projection is formed on a back side of the notch in the insertion direction so as to project further outward in the up-down direction than an up-down base face of the notch, and the detent projection is slid into the connection groove beyond the lock protrusion and locked in the lock protrusion in an extraction direction.

3. The bracket-equipped vibration-damping device according to claim 2, wherein the up-down urging rubber is positioned on a front side of the detent projection in the insertion direction.

4. The bracket-equipped vibration-damping device according to claim 1, wherein a protruding tip face of the lock protrusion is an incline relative to the insertion direction so that the protrusion dimension of the lock protrusion is gradually smaller as it goes backward in the insertion direction.

5. The bracket-equipped vibration-damping device according to claim 1, wherein the up-down urging rubber is fixed on an upper surface of the connection-insert section, while the lock protrusion protrudes in a lower inner surface of the connection groove.

6. The bracket-equipped vibration-damping device according to claim 1, wherein a surface of the connection-insert section on the second side directly abuts the inner surface of the connection groove of the bracket.

7. The bracket-equipped vibration-damping device according to claim 1, further comprising:
   a front-back urging rubber fixed on a front surface of the connection-insert section in the insertion direction; and
   a front wall provided for the bracket that obstructs a front end of the connection groove in the insertion direction so that the front-back urging rubber is compressed in a front-back direction of the insertion direction between the connection-insert section and the front wall.

8. The bracket-equipped vibration-damping device according to claim 1, wherein the at least one up-down urging rubber comprises a first up-down urging rubber and a second up-down urging rubber, and the first up-down urging rubber is fixed on the outer surface of the connection-insert section on the first side, while the second up-down urging rubber is fixed on an outer surface of the connection-insert section on the second side, and the protrusion dimension of the lock protrusion is smaller than a sum of up-down thicknesses of the first up-down urging rubber and the second up-down urging rubber, and the connection-insert section is inserted into the connection groove in the lateral direction beyond the lock protrusion and urged to the second side by the first up-down urging rubber so that the connection-insert section is locked in the lock protrusion so as to avoid extraction thereof from the connection groove, in a state where the connection-insert section is positioned relative to the connection groove in the up-down direction by the first up-down urging rubber and the second up-down urging rubber.

9. The bracket-equipped vibration-damping device according to claim 8, wherein the first up-down urging rubber is thicker than the second up-down urging rubber in the up-down direction.

10. The bracket-equipped vibration-damping device according to claim 9, wherein the first up-down urging rubber is fixed on an upper surface of the connection-insert section, while the second up-down urging rubber is fixed on a lower surface of the connection-insert section.

11. The bracket-equipped vibration-damping device according to claim 8, wherein a protruding tip face of the lock protrusion is an incline relative to the insertion direction so that the protrusion dimension of the lock protrusion is gradually smaller as it goes backward in the insertion direction.

12. The bracket-equipped vibration-damping device according to claim 8, further comprising:
   a front-back urging rubber fixed on a front surface of the connection-insert section in the insertion direction; and
   a front wall provided for the bracket that obstructs a front end of the connection groove in the insertion direction so that the front-back urging rubber is compressed in a front-back direction of the insertion direction between the connection-insert section and the front wall.

* * * * *